(12) United States Patent
Malengret et al.

(10) Patent No.: US 10,164,434 B2
(45) Date of Patent: Dec. 25, 2018

(54) METHODS AND SYSTEMS FOR POWER INJECTION OR EXTRACTION IN A POWER NETWORK

(71) Applicant: UNIVERSITY OF CAPE TOWN, Cape Town (ZA)

(72) Inventors: Michel Malengret, Cape Town (ZA); Charles Trevor Gaunt, Cape Town (ZA)

(73) Assignee: UNIVERSITY OF CAPE TOWN, Cape Town (ZA)

( * ) Notice: Subject to any disclaimer, the term of this patent is extended or adjusted under 35 U.S.C. 154(b) by 411 days.

(21) Appl. No.: 15/106,041

(22) PCT Filed: Dec. 17, 2014

(86) PCT No.: PCT/IB2014/067017
§ 371 (c)(1),
(2) Date: Jun. 17, 2016

(87) PCT Pub. No.: WO2015/092705
PCT Pub. Date: Jun. 25, 2015

(65) Prior Publication Data
US 2016/0322818 A1    Nov. 3, 2016

(30) Foreign Application Priority Data
Dec. 19, 2013 (GB) .................................. 1322487.8

(51) Int. Cl.
*G05B 15/02* (2006.01)
*H02J 3/06* (2006.01)
(Continued)

(52) U.S. Cl.
CPC ............... *H02J 3/06* (2013.01); *G05B 15/02* (2013.01); *G05F 1/625* (2013.01); *G06Q 50/06* (2013.01);
(Continued)

(58) Field of Classification Search
CPC ............... G05B 15/02; H02J 7/04; H02J 3/06
(Continued)

(56) References Cited

U.S. PATENT DOCUMENTS

| 5,570,007 A | 10/1996 | Larsen |
| 5,883,796 A | 3/1999 | Chang et al. |

(Continued)

FOREIGN PATENT DOCUMENTS

| EP | 1211 775 A1 | 6/2002 |
| WO | 2012/163979 A2 | 12/2012 |

OTHER PUBLICATIONS

International Search Report issued in PCT/IB2014/067017 dated Mar. 30, 2015 (3 pages).
Written Opinion of the International Searching Authority issued in PCT/IB2014/067017 dated Mar. 30, 2015 (7 pages).
Rowey, C.N. et al.; "An Intelligent Current Limiter and Zero Active Power Injection Algorithm for Microgrid Voltage Support"; IEEE PEDS 2011, Singapore, Dec. 5-8, 2011 pp. 770-775 (6 pages).
(Continued)

*Primary Examiner* — Michael J Brown
(74) *Attorney, Agent, or Firm* — Osha Liang LLP

(57) ABSTRACT

Systems and methods for injecting power into or extracting power out of a power network are provided. In a method, Thevenin parameters, in the form of at least a Thevenin voltage and a Thevenin resistance, of an equivalent Thevenin circuit are obtained with respect to each wire of the PCC. A total Thevenin power for all the wires is obtained, based on a specific amount of power at the PCC and the obtained Thevenin parameters. The method calculates an optimal current to be injected into or extracted from the PCC so as to inject or extract a specific amount of power. The calculation is based on the total Thevenin power and the Thevenin parameters. The method controls an injection or extraction of current at the PCC in accordance with the optimal current.

17 Claims, 9 Drawing Sheets

(51) Int. Cl.
    *G06Q 50/06*    (2012.01)
    *H02J 3/46*    (2006.01)
    *G05F 1/625*    (2006.01)
    *H02J 7/04*    (2006.01)
    *H02J 3/38*    (2006.01)
    *H02J 3/00*    (2006.01)

(52) U.S. Cl.
    CPC ............... *H02J 3/46* (2013.01); *H02J 3/381* (2013.01); *H02J 2003/007* (2013.01); *Y02E 40/76* (2013.01); *Y02E 60/76* (2013.01); *Y04S 10/545* (2013.01); *Y04S 40/22* (2013.01)

(58) Field of Classification Search
    USPC ............................................................. 700/297
    See application file for complete search history.

(56) References Cited

U.S. PATENT DOCUMENTS

| | | | | |
|---|---|---|---|---|
| 2010/0332040 | A1* | 12/2010 | Garcia | F03D 7/0284 700/287 |
| 2013/0119950 | A1 | 5/2013 | Nelson | |
| 2015/0134132 | A1* | 5/2015 | Feng | H02J 4/00 700/286 |

OTHER PUBLICATIONS

Hague, M.H.; "Compensation of Distribution System Voltage Sag by DVR and D-STATCOM"; IEEE 2001, Porto Power Tech Conference; Porto, Portugal, Sep. 10-13, 2001 (5 pages).

Mou, Xiaoming et al.; "A Preliminary Study on the Thevenin Equivalent Impedance for Power Systems Monitoring"; Harbin Institute of Technology, Department of Electrical Engineering, 2011 4th International Conference, IEEE; Jul. 6, 2011, pp. 730-733 (4 pages).

Di Fazio, Anna R. et al.; "Enhancing Distribution Networks to Evolve toward Smart Grids: the Voltage Control Problem"; 52nd IEEE Conference on Decision and Control; Florence, Italy, Dec. 10-13, 2013, pp. 6940-6945 (6 pages).

Malengret, M. et al.; "General Theory of Instantaneous Power for Multi-Phase Systems with Distortion, Unbalance and Direct Current Components"; Electric Power Systems Research, vol. 81, 2011, pp. 1897-1904 (8 pages).

Malengret, M. et al.; "General Theory of Average Power for Multi-Phase Systems with Distortion, Unbalance and Direct Current Components"; Electric Power Systems Research, vol. 84, 2012, pp. 224-230 (7 pages).

Gaunt, C.T. et al.; "True Power Factor Metering for m-wire Systems with Distortion, Unbalance and Direct Current Components"; Electric Power Systems Research, vol. 95, 2013, pp. 140-147 (8 pages).

* cited by examiner

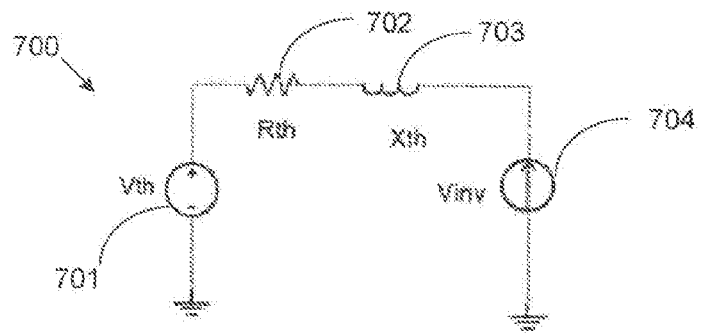
Figure 7
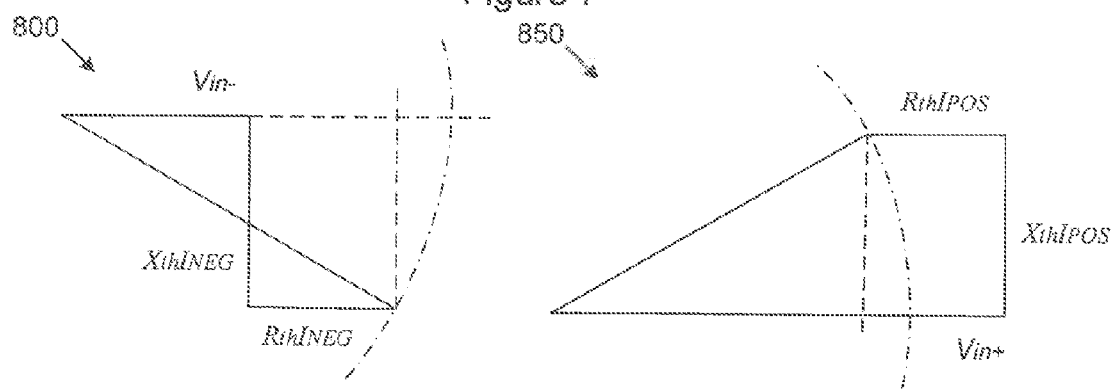
Figure 8A
Figure 8B
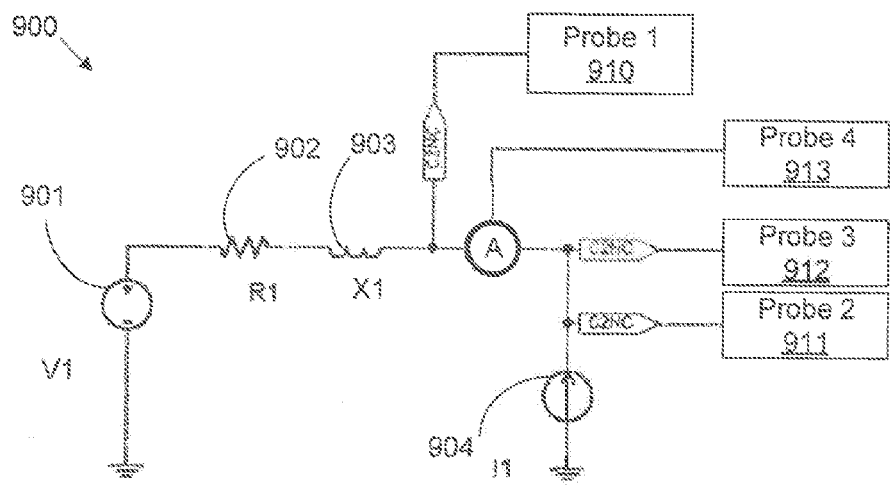
Figure 9

METHODS AND SYSTEMS FOR POWER INJECTION OR EXTRACTION IN A POWER NETWORK

CROSS-REFERENCE(S) TO RELATED APPLICATIONS

This application claims priority to United Kingdom patent application number 1322487.8, which is incorporated by reference herein.

FIELD OF THE INVENTION

This invention relates to methods and systems for power injection or extraction in a power network, in particular, current compensation by determining optimal currents for power injection or extraction.

BACKGROUND TO THE INVENTION

Most power systems today are run using two or more wires alternating current (AC) at low, medium and high voltages and in some cases using high voltage direct current (DC) (HVDC).

Both AC and DC transmission lines have losses which are proportional to the square of current and the resistance of the wires (i.e. $I^2R$). The power transmitted is proportional to the product of the current and the voltage if they are in phase.

In order to reduce the transmission losses, the voltages are increased in the case of AC using transformers and in the case of DC power electronic converters and transformers. The most efficient way of transmitting power in a two wire single generator system is when the current is in phase with the generator voltage. In the case of multiple wires and generators, the way of transmitting currents with minimum losses becomes more complex to resolve.

Power networks may be small networks or micro-grids or large national grids with loads and supplies of many different forms.

Generally power systems are made up of: generators which transfer energy from a source of heat, light, wind, chemical or other energy into electrical energy; transmission networks which transport energy over long distances to distribution networks; distribution networks which distribute energy to loads; and the loads which absorb energy at a random basis in a finite domain.

New innovations in power electronics have provided new ways to optimise power systems by reducing power losses. The new developments have also led to opportunities for private customers to generate power from wind or sun energy and inject power into the grid as well as supplying reactive power for the load to reduce current magnitude drawn from the grid which otherwise increases transmission losses.

Due to advancing technology, it is becoming easier and more economical to generate power at various points of interest on a network including at the point of consumption. This power is not only used to supply loads at the point of consumption, but also to be injected into the power network when excess power is generated. Injecting power into the network can be done in many different ways as modern power electronic converters can easily control the magnitude and phase angle of the currents that are injected into each of the wires of the network. This therefore raises the question as to what these need to be so that the network will receive or supply power with minimum transmission losses.

The power in a multi-wire system is normally injected into a network equally in magnitude and in phase with the voltage at the point of connection. However, this is not necessarily the most efficient way for power to flow to its point of consumption as the resistance and reactance characteristics as well as the voltage of each wire may not always be the same.

SUMMARY OF THE INVENTION

In accordance with a first aspect of the invention, there is provided a method for injecting power into or extracting power out of a power network at a point of common coupling (PCC) having one or more wires, comprising: obtaining Thévenin parameters in the form of at least a Thévenin voltage and a Thévenin resistance of an equivalent Thévenin circuit with respect to each wire of the PCC; calculating a total Thévenin power for all the wires based on a specific amount of power at the PCC and the obtained Thévenin parameters; calculating an optimal current to be injected into or extracted from the PCC so as to inject or extract a specific amount of power, wherein the calculation is based on the total Thévenin power and the Thévenin parameters; and controlling an injection or extraction of current at the PCC in accordance with the optimal current.

Further features provide for obtaining Thévenin parameters in the form of at least a Thévenin voltage and a Thévenin resistance of an equivalent Thévenin circuit with respect to each wire of the PCC to include: measuring a voltage at the PCC with no injected current to obtain a Thévenin voltage; and injecting a known current and measuring voltage changes to calculate a Thévenin resistance.

A still further feature provides for controlling an injection or extraction of current at the PCC in accordance with the optimal current to include: controlling an injection or extraction of the optimal currents in each wire using a series connected converter or inverter.

Yet further features provide for controlling an injection or extraction of current at the PCC in accordance with the optimal current to include controlling an injection or extraction of the optimal currents in each wire using a shunt connected converter or inverter, including: measuring a source or load current on each wire at the PCC; calculating a difference between the measured current and a calculated optimal current; injecting or extracting the difference in current using the shunt connected converter or inverter.

Even further features provide for the method to be iterated by: injecting or extracting a first calculated optimal current; re-obtaining the Thévenin parameters; and calculating a second calculated optimal current based on the re-obtained Thévenin parameters.

Injecting or extracting a current and re-obtaining the Thévenin parameters may repeat periodically to produce a running value of the Thvénin parameters.

Injecting or extracting a current may superimpose the injected current on any injected or extracted current.

A further feature provides for controlling an injection or extraction of current to inject a current in phase with the Thévenin voltage so as to ensure that losses of network wires are minimum.

The Thévenin resistance may be used for calculating a magnitude of the optimal current. The Thévenin parameters may include a Thévenin reactance which is used for calculating a phase angle of the optimal current.

A still further feature provides for the method to include calculating a Thévenin voltage measured from a resistance weighted null reference point by measuring a voltage of a wire at any reference point when no current is injected.

Even further features provide for obtaining Thévenin parameters to include obtaining the Thévenin resistance by: injecting a current in phase with the Thévenin voltage and then measuring a voltage at the PCC; injecting a current in anti-phase with the Thévenin voltage and then measuring a voltage at the PCC; calculating the Thévenin resistance by taking an absolute value of the difference of the two above voltages measured at the PCC and dividing by two times the magnitude of the injected current.

Further features provide for obtaining Thévenin parameters to include obtaining the Thévenin reactance by: injecting a current at a +90 degree phase shift with the Thévenin voltage and then measuring a voltage at the PCC; injecting a current at a −90 degree phase shift with the Thévenin voltage and then measuring a voltage at the PCC; calculating the Thévenin reactance by taking an absolute value of the difference of the two above voltages measured at the PCC and dividing by two times the magnitude of the injected current.

The voltages measured may be fundamental frequency voltages and calculated with respect to a resistance weighted null reference point dependent on Thévenin's wire equivalent resistance.

Yet further features provide for calculating the optimal current to be injected or extracted to include: changing Thévenin voltages for wires at a resistance weighted null reference point to a weighted Thévenin equivalent voltage vector dependent on Thévenin equivalent resistances; calculating an optimal Thévenin total wire power at the equivalent Thévenin voltage points; calculating a constant $k_A$ with the calculated Thévenin total wire power divided by the norm squared of the weighted Thévenin equivalent voltage vector; calculating a weighted current vector by multiplying the constant $k_A$ by the weighted Thévenin voltage vector.

Still further features provide for the method to include calculating an optimal additional Thévenin power that can reach a network equivalent point of consumption when injecting or extracting a specific amount of power at a point of common coupling after the Thévenin parameters have been determined.

One embodiment provides for the method to include calculating Thévenin total wire power by an iterative method including: calculating optimal wire currents; determining total power losses for each of the wires; deducing the total wire losses based on a specific amount of power at the point of common coupling: and iterating the method until the Thévenin power converges to sufficient accuracy.

Further features provide for the method to include calculating an optimal power to be injected or extracted at a point of common coupling after obtaining the Thévenin parameters so that a specific amount of power optimally reaches points of consumption.

In one embodiment, the point of common coupling is at a multiple wire sinusoidal alternating current (AC) system and calculating the optimal current calculates the current magnitude and phase angle. In another embodiment, the point of common coupling is at a two wire sinusoidal alternating current (AC) system and calculating the optimal current calculates the phase angle. In a further embodiment, the point of common coupling is at a two or multiple wire direct current (DC) system and calculating the optimal current calculates the current magnitude.

A further feature provides for the method to include calculating an optimal additional power that can reach a network equivalent point of consumption when optimally injecting or extracting a specific amount power at a specific point of common coupling (PCC) based on the obtained Thévenin parameters.

Still further features provide for the method to include: performing a current compensation method with known source voltages and known power injected or extracted; calculating the additional power loss associated with the known power injected or extracted at a common point of coupling; determining if the power loss is a minimal power loss that can be achieved by comparing calculated wire losses with theoretically achievable minimal losses.

Yet further features provide for calculating the power loss associated with the known power injected or extracted at a common point of coupling to be calculated based on a total Thévenin power and the individual Thévenin voltages and Thévenin resistances of each wire at a point of common coupling.

In accordance with a second aspect of the invention, there is provided a method for calculating the power to be injected into or extracted out of a power network, comprising: determining one or more dynamically changing Thévenin parameters of an equivalent Thévenin circuit with respect to each wire of a point of common coupling (PCC); and calculating an optimal power to be injected or extracted at a point of common coupling based on the determined Thévenin parameters so that a specific amount of power reaches network consumers with minimal losses.

Further features provide for the method to include: calculating transmission losses at each of a plurality of points of common coupling based on the calculated optimal power to be injected or extracted at that point; determining a most favourable point of common coupling.

In accordance with a third aspect of the invention, there is provided a system for injecting power into or extracting power out of a power network at a point of common coupling (PCC) having one or more wires, comprising: a Thévenin parameter component for obtaining Thévenin parameters in the form of at least a Thévenin voltage and a Thévenin resistance of an equivalent Thévenin circuit with respect to each wire of the PCC; a Thévenin power component for calculating a total Thévenin power for all the wires based on a specific amount of power at the PCC and the obtained Thévenin parameters; an optimal current component for calculating an optimal current to be injected into or extracted from the PCC so as to inject or extract a specific amount of power, based on the total Thévenin power and the Thévenin parameters; and a controlling component for controlling an injection or extraction of current at the PCC in accordance with the optimal current.

Further features provide for the Thévenin parameter component for obtaining Thévenin parameters in the form of at least a Thévenin voltage and a Thévenin resistance of an equivalent Thévenin circuit with respect to each wire of the PCC to include: a voltage measuring component for measuring a voltage at the PCC with no injected current to obtain a Thévenin voltage; and a known current injecting component for injecting a known current and the voltage measuring component also for measuring voltage changes to calculate a Thévenin resistance.

A still further feature provides for the controlling component for controlling an injection or extraction of current at the PCC in accordance with the optimal current, to include: a series connected converter or inverter for controlling an injection or extraction of the required optimal currents in each wire.

Yet further features provide for the controlling component for controlling an injection or extraction of current at the PCC in accordance with the optimal current to include a shunt connected converter or inverter for controlling an injection or extraction of the required optimal currents in each wire, including components for: measuring a source or load current on each wire at the PCC; calculating a difference between the measured current and a calculated optimal current; and injecting or extracting the difference in current using the shunt connected converter or inverter.

Even further features provide for the system to include an iterating component for iterating the method by: injecting or extracting a first calculated optimal current; re-obtaining the Thévenin parameters; and calculating a second calculated optimal current based on the re-obtained Thévenin parameters.

Further features provide for the system to include a re-evaluating component for injecting or extracting a first calculated optimal current; re-obtaining the Thévenin parameters; and calculating a second calculated optimal current based on the re-obtained Thévenin parameters.

Still further features provide for the Thévenin parameter component to include a Thévenin resistance obtaining component for obtaining the Thévenin resistance which is used for calculating a magnitude of the current.

A yet further feature provides for the Thévenin parameter component to include a Thévenin reactance obtaining component for obtaining a Thévenin reactance which is used for calculating a phase angle of the optimal current.

A still further feature provides for the voltage measuring component to calculate a Thévenin voltage measured from a resistance weighted null reference point by measuring a voltage of a wire at any reference point when no current is injected.

Further features provide for the Thévenin resistance obtaining component to be for carrying out the steps of obtaining the Thévenin resistance by: injecting a current in phase with the Thévenin voltage and then measuring a voltage at the PCC; injecting a current in anti-phase with the Thévenin voltage and then measuring a voltage at the PCC; calculating the Thévenin resistance by taking an absolute value of the difference of the two above voltages measured at the PCC and dividing by two times the magnitude of the injected current.

Even further features provide for the Thévenin reactance obtaining component to be for obtaining the Thévenin reactance by: injecting a current at a +90 degree phase shift with the Thévenin voltage and then measuring a voltage at the PCC; injecting a current at a −90 degree phase shift with the Thévenin voltage and then measuring a voltage at the PCC; calculating the Thévenin reactance by taking an absolute value of the difference of the two above voltages measured at the PCC and dividing by two times the magnitude of the injected current.

The system may include a timer and injecting a current and re-obtaining the Thévenin parameters may repeat periodically to produce a running value of the Thévenin parameters.

Injecting a current may superimpose the injected current on any injected or extracted current.

Further features provide for the optimal current component to be for carrying out the steps of: changing Thévenin voltages for wires at a resistance weighted null reference point to a weighted Thévenin equivalent voltage vector dependent on Thévenin equivalent resistances; calculating an optimal equivalent total wire power at the equivalent Thévenin voltage points; calculating a constant $k_A$ with the calculated Thévenin total wire power divided by the norm squared of the weighted Thévenin equivalent voltage vector; calculating a weighted current vector by multiplying the constant $k_A$ by the weighted Thévenin voltage vector.

In one embodiment, the point of common coupling is at a multiple wire sinusoidal alternating current (AC) system and the optimal current component calculates the current magnitude and phase angle. In another embodiment, the point of common coupling is at a two wire sinusoidal alternating current (AC) system and the optimal current component calculates the phase angle.

In yet another embodiment, the point of common coupling is at a two or multiple direct current (DC) wire system and the optimal current component calculates the current magnitude.

In accordance with a fourth aspect of the invention, there is provided a computer program product for injecting power into or extracting power out of a power network at a point of common coupling (PCC) to the power network, wherein the PCC has one or more wires, the computer program product comprising a computer-readable medium having stored computer-readable program code for performing the steps of: obtaining Thévenin parameters in the form of at least a Thévenin voltage and a Thévenin resistance of an equivalent Thévenin circuit with respect to each wire of the PCC; calculating a total Thévenin power for all the wires based on a specific amount of power at the PCC and the obtained Thévenin parameters; calculating an optimal current to be injected into or extracted from the PCC so as to inject or extract a specific amount of power, wherein the calculation is based on the total Thévenin power and the Thévenin parameters; and controlling an injection or extraction of current at the PCC in accordance with the optimal current.

Further features provide for the computer-readable medium to be a non-transitory computer-readable medium and for the computer-readable program code to be executable by a processing circuit.

BRIEF DESCRIPTION OF THE DRAWINGS

The invention will now be described, by way of example only, with reference to the accompanying representations in which:

FIG. 7 is a schematic diagram which illustrates a Thévenin network in accordance with aspects of the invention;

FIG. 8A is a phasor diagram for positive current injection according to embodiments of the invention;

FIG. 8B is a phasor diagram for negative current injection according to embodiments of the invention;

FIG. 9 is a schematic diagram of a resistor calculator according to embodiments of the invention;

DETAILED DESCRIPTION WITH REFERENCE TO THE DRAWINGS

Figure 1:
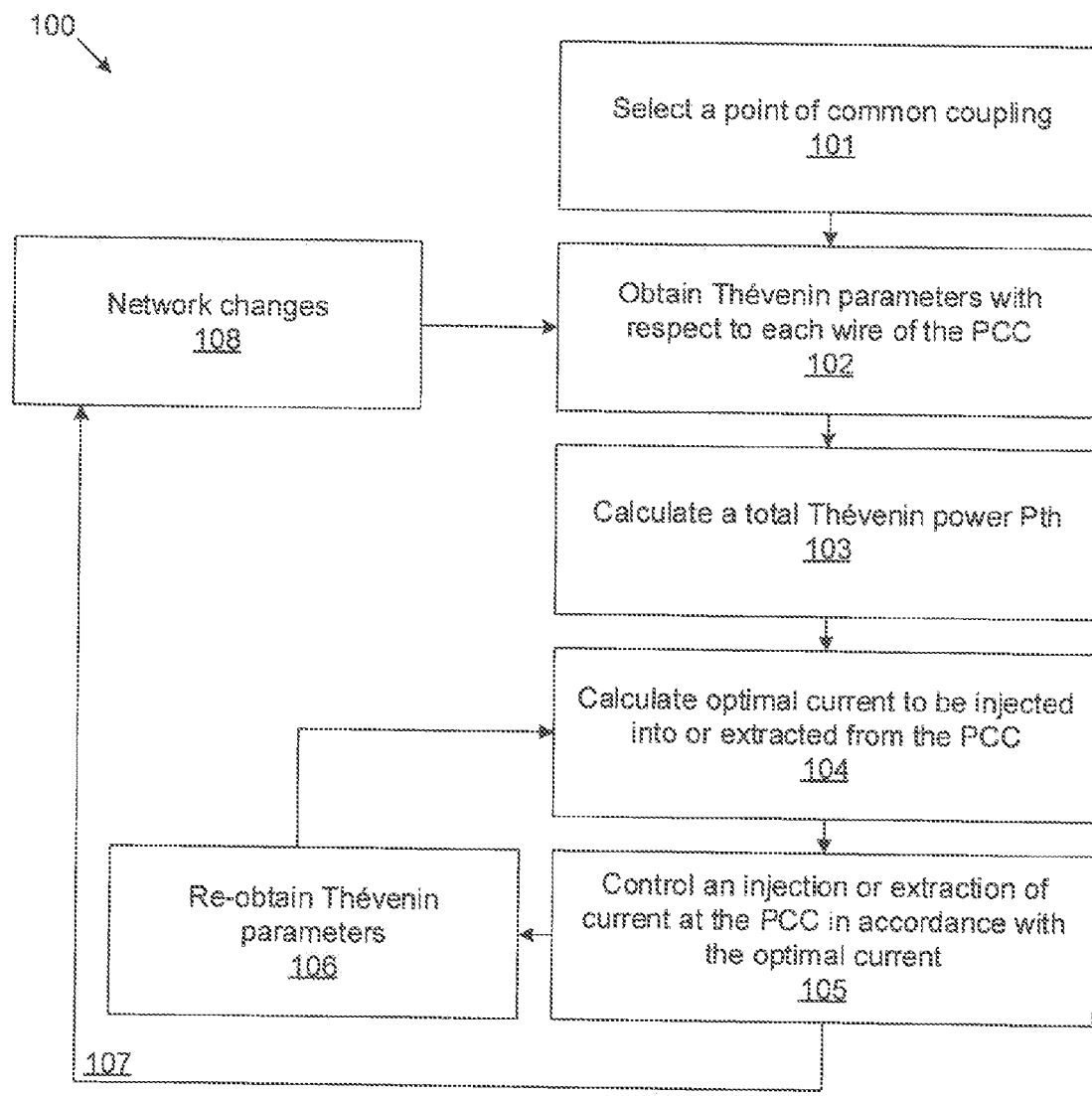
FIG. 1 is a flow diagram which illustrates a method according to embodiments of the invention.

For any point of interest on a network, it is possible to replace the network with an equivalent Thévenin circuit consisting of a Thévenin equivalent voltage ($V_{th}$), resistor ($R_{th}$) and reactance ($X_{th}$) in series that varies with time.

The Thévenin voltage is an equivalent voltage at a particular time and not one that can be identified to be at any particular point. It is where the power gets absorbed to do useful work (including alleviating existing transmission losses) in the case of injecting into a network or where it comes from when extracting power from a network. It has not got a physical presence but is an equivalent "point" if the network is simplified to a three element circuit $V_{th}$, $R_{th}$ and $X_{th}$ with respect to a point of common coupling (PCC) where a converter "device" gets connected.

The current at the Thévenin "fictitious" or "equivalent" voltage needs to be in phase to obtain least losses.

The described methods and systems provide an optimised method of injecting electric power into a single phase or multi-wire wire power network, so that the power reaches its destination where it is consumed with minimal loses. The described method and system may also be applied to extraction of power from the power network.

A method and a system may be provided that inject or extract electric power into or out of a single or multi-wire power network, so that the additional power injected into or extracted from a network is transmitted from source to destination into or out of the network, as the case may be, in a way that the entire electric network experiences minimal loses. The method and system may be easily used in sinusoidal AC or DC implementations and can be extended to any voltage or current shaped system. When extended to any voltage or current shaped system such as non-sinusoidal, unbalanced, or unsymmetrical systems, the principle is also valid but the fundamental frequency voltage also needs to be measured.

The method and system provide the described optimisation by first determining the network Thévenin's equivalent circuit with respect to a point of common coupling (PCC) of a device to a power network. The Thévenin equivalent circuit consists of three components in series: the Thévenin voltage ($V_{th}$), the Thévenin equivalent resistor ($R_{th}$), and the Thévenin reactance ($X_{th}$).

Using the above dynamically changing Thévenin parameters of each of the phases of the one or more wires, the correct optimal currents may be determined and injected or extracted in a manner that reduces the electrical transmission losses ($I^2R$) of the network to a minimum. This minimum may be limited by the capacity of the load and the PCC and thus may not be an absolute minimum. The losses could, for example, be reduced even further by other similar devices at other points of common coupling. Thus terms used throughout this specification such as "minimum losses", "ensuring that losses of network wires are minimum", "optimal current" and the like should be construed within this constraint.

The total losses of the network are minimised at all times even with a dynamically changing network where the Thévenin characteristics with respect to the PCC are changing continuously as a result of loads and power availability changes.

For example, any three wire network, small or large, may be modelled as three Thévenin equivalent single phase circuits where the sum of the currents are zero (which may be referenced to a null weighted voltage reference point in the more general cases where instantaneous and average zero sequence voltage components exist and can include harmonics and DC components as well).

In order to obtain the maximum power from an energy source connected to a PCC in a network and this power reaching the effective point of consumption, (which is effectively the Thévenin voltages of each of the phases), it is required to calculate how the current needs to be optimally injected (i.e. so as to obtain minimum network transmission losses). The Thévenin voltage is not a specific point in the network but an equivalent (pseudo point of consumption or supply) voltage point with respect to any specific PCC.

It is found that the network with respect to a specific PCC may be replaced with a simple Thévenin's equivalent circuit consisting of a Thévenin voltage $V_{th}$, a Thévenin equivalent resistor $R_{th}$, and a Thévenin reactance $X_{th}$ of each phase which is a sufficient representation of a single phase system with respect to the PCC for the purpose of calculating the currents needed to transmit power optimally with the method described. An exemplary embodiment of an effective method of dynamically obtaining Thévenin parameters at any time is described, although other methods of obtaining the Thévenin parameters may also be used. A very effective method is then described of how to calculate the optimal currents required at all times.

Any m-wire network, which may be a small or large network, can be modelled as m single Thévenin equivalent networks, referenced to a resistance weighted null reference point, at any node on the network. As the network changes in real time the equivalent models will change accordingly.

The reference point is derived from the sum of all the measured voltages from a common reference (one of the wires), each divided by the respective wire resistance, the total being divided by the sum of the conductances of the wires.

Voltages used in the systems and methods described herein may be adjusted based on the resistance weighted null reference point, and are not the raw measurements, as used by others, which cannot give true Thévenin equivalent parameters.

Having obtained the equivalent Thévenin parameters for the m single Thévenin equivalent networks, one can calculate the m currents and phase angles using a current compensation method. This therefore implies that the power injected into each of the wires is not necessarily in equal proportion.

Various current compensation methods may be used. In simple power system cases, and assuming that the Thévenin's parameters are known, current may be calculated by permutation analysis; however, this may be time consuming.

A permutation approach used may consist of splitting the total power available at a PCC between the wires in all possible ways and calculating the total Thévenin power obtained for each case. This may be first done in allocating 10, 20, 30, to 100% of the total power to each wire and analysing all the possible permutations thereof. The power split that gives minimal loss would give an approximation within 10% of where the maximum split is and could be more accurately ascertained by repeating the process by zooming in around the point found with 1% increments. If two load currents at different times and voltages at a PCC are known in magnitude and angle it is possible to extract the Thévenin resistance, reactance and Thévenin voltage magnitude.

A known current compensation method is described in M. Malengret and C. T. Gaunt, "General theory of instantaneous power for multi-phase systems with distortion, unbalance and direct current components," Electric Power Systems Research 81.10, pp. 1897-1904, 2011 which is incorporated by reference herein. This paper discusses compensated supply-wire current that deliver a given instantaneous power and is hereinafter referred to as "Paper 1".

A further current compensation method is described in M. Malengret and C. T. Gaunt, "General theory of average power for multi-phase systems with distortion, unbalance and direct current components.", Electric Power Systems Research 84.1, pp. 224-230, 2012 which is incorporated by reference herein. The first paper is extended to be applicable to the average power domain for any m-wire system with wires of any resistance under conditions of distortion (non-sinusoid), unbalance and DC offset. This paper is hereinafter referred to as "Paper 2".

Applications of the current compensation method are described in C. T. Gaunt and M.

Malengret, "True power factor metering for m-wire power systems with distortion, unbalance and direct current components", Electric Power Systems Research, 95, pp 140-147 which is incorporated by reference herein. This paper illustrates the practicality of measurement of distorted power supplies and is hereinafter referred as "Paper 3".

Paper 1, Paper 2 and Paper 3 may collectively be referred to as the "Malengret and Gaunt papers", or the like, throughout the description which follows. Similarly, methods developed in these papers may be referred to as "Malengret and Gaunt methods", or the like.

The methods of current compensation described in the published papers can only be applied if the line resistance of all the wires (including neutral or earth in case of single wire return (SWER)) is known. In the described method, using found Thévenin resistances instead of the known line resistances and Thévenin power $P_{th}$ instead of the load power, the current compensation methods developed by M. Malengret and C. T. Gaunt find new application which goes beyond just power factor compensation.

Referring to FIG. 1, a flow diagram (100) shows an example embodiment of the described method. The method may be conducted at a current compensator system which, for example, may be provided with a microgrid central controller (MGCC) or a device such as an inverter, converter, or the like.

The described method may be applied at a device for injecting or extracting power into or out of a power network. For example, the device may be an inverter or converter for injecting or extracting power or adjusting the allocation of power to each wire (in-line or shunt connected) into or out of a power network.

The method may be used in the following contexts:
In multiple wire sinusoidal systems (AC) to obtain the required current magnitude and phase angle to inject or extract for each wire.
In a single phase sinusoidal AC system in order to obtain a phase angle of the current to be injected or extracted.
In a two wire (including a single and earth return in the case of SWER) or multi-wire wire DC system in order to obtain magnitudes of the currents to be injected or extracted.
In two or multi-wire systems with non-sinusoidal currents and voltages.
In any voltage and current waveforms as well as combinations of the above.

A point of interest on an m-wire power network is selected, at a first step (101), as a point of common coupling. It is possible to replace the network with an equivalent Thévenin circuit with respect to each of the wires of the PCC.

Thévenin parameters in the form of at least a Thévenin voltage ($V_h$) and a Thévenin resistance ($R_h$) of an equivalent Thévenin circuit with respect to each wire of the PCC are obtained in a next step (102). The Thévenin parameters of a power network may change dynamically with time and as such obtaining Thévenin parameters may obtain a snap-shot of the Thévenin parameters at a particular instance. Thus, the network equivalent Thévenin voltage $V_{th}$ is constant with respect to the PCC for a specific condition of the network (for example, for a sufficiently small time interval).

The step (102) of obtaining Thévenin parameters may further include obtaining a Thévenin reactance ($X_{th}$). The Thévenin resistance ($R_{th}$) may be used for calculating the magnitude of the optimal current while the Thévenin reactance ($X_{th}$) may be used for calculating the phase angle of the optimal current.

Any suitable method of obtaining Thévenin parameters may be used. In some cases, the step (102) of obtaining Thévenin parameters may include measuring a voltage at the PCC with no injected current to obtain a Thévenin voltage and then injecting a known current and measuring voltage changes to calculate a Thévenin resistance.

When the method is applied in a multiple (m-) wire alternating current (AC) system in order to obtain current magnitude and phase angle for each wire, the Thévenin resistance $R_{th}$ and the Thévenin reactance $X_{th}$ may be determined for each of the wires and numbered 1 to m.

When the method is applied in a two wire AC system in order to obtain a phase angle of the current to be injected or extracted, the Thévenin reactance $X_{th}$ may be determined. A single wire earth return (SWER) system may also be considered as two wires, the earth would then be considered as a wire.

When the method is applied in a two or multiple wire DC system in order to obtain a magnitude of the current to be injected or extracted, the Thévenin resistances $R_{th}$ may be determined.

Having obtained, or determined, the Thévenin parameters, a total Thévenin power (Pt) is then calculated based on a specific amount of power at the point of common coupling (PCC) and the obtained Thévenin parameters at a next step (103).

At a next step (104), an optimal current, for example, a currents compensation vector, to be injected into or extracted from the PCC so as to inject or extract a specific amount of power is calculated. The calculation may be based on the total Thévenin power and the Thévenin parameters. Calculating the currents compensation vector may determine the optimal current magnitudes and/or phases to be injected or extracted.

At a following step (105), an injection or extraction of current at the PCC in accordance with the optimal current is controlled. In one embodiment, the step (105) of controlling an injection or extraction of current at the PCC in accordance with the optimal current may include controlling an injection or extraction of the required optimal currents in each wire using a series connected converter. In another embodiment, the step (105) of controlling an injection or extraction of current at the PCC in accordance with the optimal current includes controlling an injection or extraction of the required optimal currents in each wire using a shunt connected converter. This in turn includes measuring a source or load current on each wire at the PCC and then calculating a difference between the measured current and a calculated optimal current. The difference in current is then injected or extracted using the shunt connected converter.

The Thévenin parameters may be re-obtained in a following step (106) after injecting or extracting a first calculated optimal current (or a difference between a calculated optimal current and a measured current). This may be done if need be for further accuracy by superposing current on the existing compensator currents to adjust any inaccuracies or influence the injected or extracted currents may have on the equivalent Thévenin parameters of the network (e.g. non-linearity). The compensating currents can then be re-calculated and adjusted accordingly and a second calculated optimal current based on the obtained dynamically changing Thévenin parameters may then be injected or extracted.

The process may be an iterative one as due to the non-linearity of the system one would need to inject the power in incremental steps and establish the more accurate Thévenin parameters as the injected or extracted power may affect the accuracy of Thévenin parameters.

The method may loop (107) to accommodate changes in the power network (108) to the second step (102) of obtaining Thévenin parameters in the form of at least a Thévenin voltage and a Thévenin resistance of an equivalent Thévenin circuit with respect to each wire of the PCC.

The iterative determining of the dynamically changing Thévenin parameters and the corresponding dynamic changes to the injected or extracted current may repeat at regular time intervals to adjust to network changes and to improve accuracy of the determination of Thévenin parameters. The regular time intervals may be every second, 20 seconds, minute, etc. depending on the application.

Figure 2:
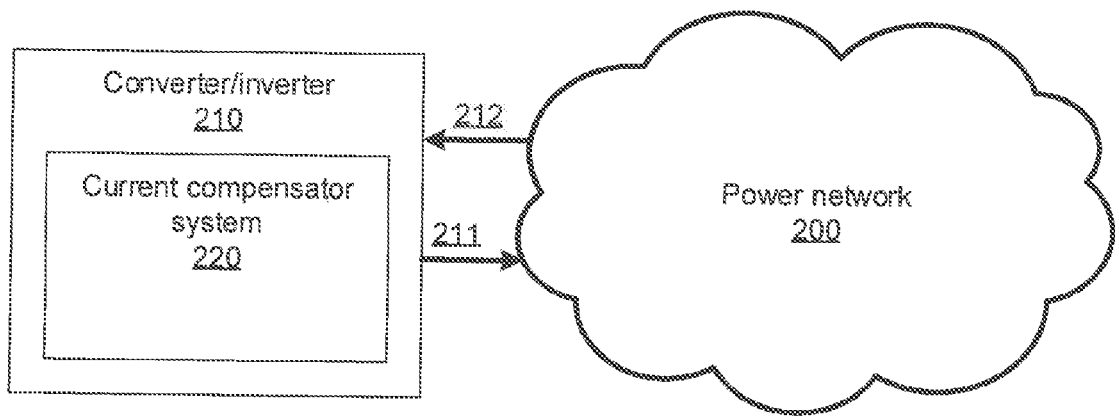
FIG. 2 is a schematic diagram which illustrates components of a system according to embodiments of the invention.

Referring to FIG. 2, an exemplary power network (200) is shown in a schematic form in which the described method and system may be implemented.

A power network (200) may be anything from small to very large and may include multiple nodes. The power network (200) may be constantly evolving as a result of loads and power generation availability changes.

A device (210) may be provided for injecting current into (211) or extracting current from (212) the power network (200). The device (210) may be an inverter or a converter.

The described system provides a current compensator system (220) for the device (210) which dynamically determines the optimal current magnitude and/or phase to inject into or extract from the power network (200) in order to minimise losses across the power network (200). In some cases the current compensator system (220) may include a controller which controls an inverter or converter and, in particular, which controls the injection or extraction of current into or out of the network.

In some implementations, the current compensator system (220) may have a processing circuit for executing computer-readable program code for controlling the injecting of power into or extracting power out of a power network.

It is anticipated that the current compensator system (220) may be remote from the device (210). In some cases, the current compensator system may communicate with a number of devices via a communication network and may dynamically determine the optimal current magnitude and/or phase which each of the number of devices is to inject into or extract from the power network in order to minimise losses across the power network. The current compensator system may, for example, obtain measurements from the devices via the communication network and may transmit control instructions for the injecting or extracting of current to the devices.

Figure 3:
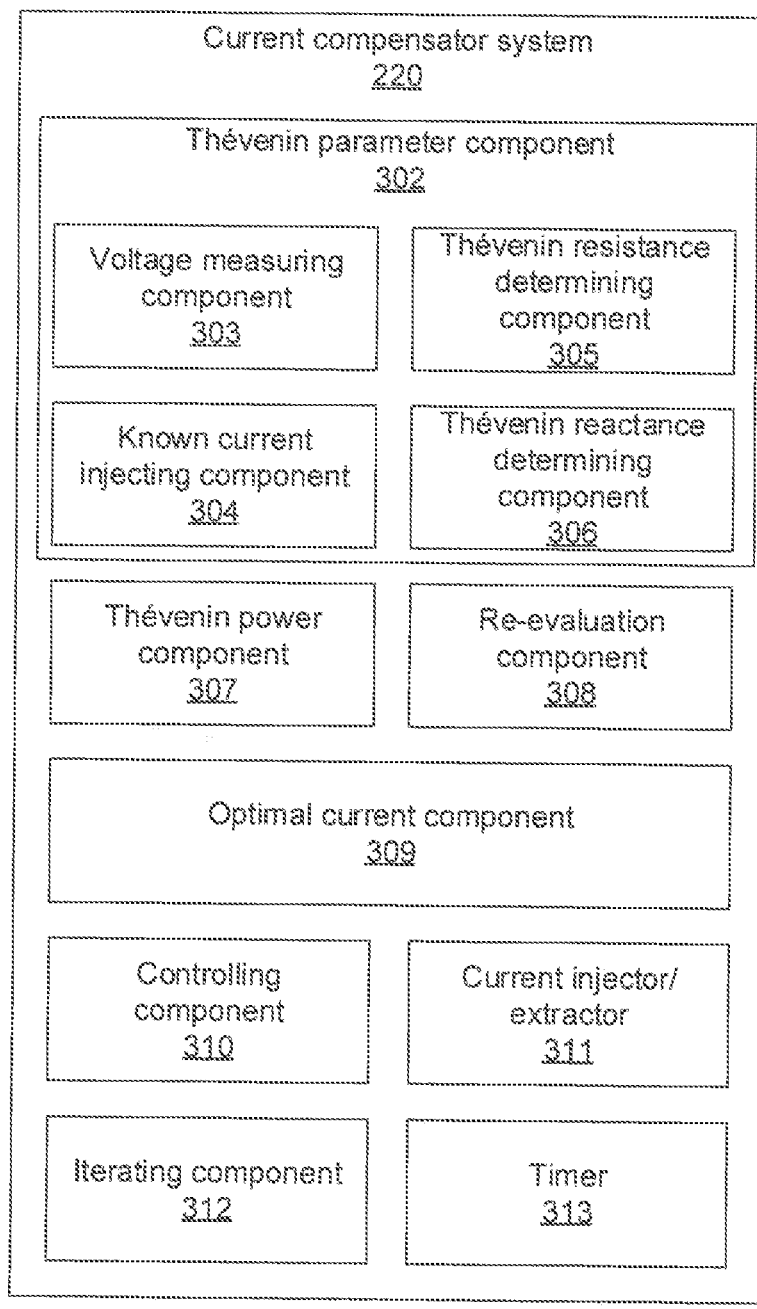
FIG. 3 is a block diagram which illustrates components of a system according to embodiments of the invention.

Referring to FIG. 3, a block diagram shows an example embodiment of a current compensator system (220) for injecting power into or extracting power out of a power network at a point of common coupling (PCC) having one or more wires at which Thévenin parameters may be determined.

The system may include a Thévenin parameter component (302) for obtaining Thévenin parameters in the form of at least a Thévenin voltage and a Thévenin resistance of an equivalent Thévenin circuit with respect to each wire of the PCC. The Thévenin parameter component (302) may include a voltage measuring component (303) for measuring a voltage at the PCC with no injected current to obtain a Thévenin voltage and a known current injecting component (304) for injecting a known current. The voltage measuring component (303) may also measure voltage changes to calculate a Thévenin resistance. A Thévenin resistance determining component (305) may be provided for calculating the Thévenin resistance. The Thévenin parameter component (302) may also include a Thévenin reactance determining component (306) for determining a Thévenin reactance.

A Thévenin power component (307) may be provided for calculating a total Thévenin power for all the wires based on a specific amount of power at the PCC and the obtained Thévenin parameters.

A Thévenin parameter re-evaluation component (308) may be provided for further adjustment of the parameters after injection or extraction of the calculated current.

An optimal current component (309) may be provided for calculating an optimal current to be injected into or extracted from the PCC so as to inject or extract a specific amount of power, based on the total Thévenin power and the Thévenin parameters. Calculating the optimal current may include calculating a magnitude and/or phase to be injected or extracted by the current compensator system (220).

A controlling component (310) for controlling an injection or extraction of current at the PCC in accordance with the optimal current may also be provided. In some embodiments, a current injector/extractor (311) may be provided for injecting or extracting current at the PCC in accordance with the optimal current.

In one embodiment, the controlling component (310) includes or may interface to a series connected converter for controlling an injection or extraction of the required optimal currents in each wire. In another embodiment, the controlling component (310) includes or may interface to a shunt connected converter for controlling an injection or extraction of the required optimal currents in each wire. The shunt connected convertor may include components for measuring a source or load current on each wire at the PCC, calculating a difference between the measured current and a calculated optimal current and injecting or extracting the difference in current using the shunt connected converter.

An iterating component (312) may be provided for iterating the method and a timer (313) may be provided for timing iterations of the dynamic current compensation.

Simple Thévenin's Model of Power Network

Figure 4:
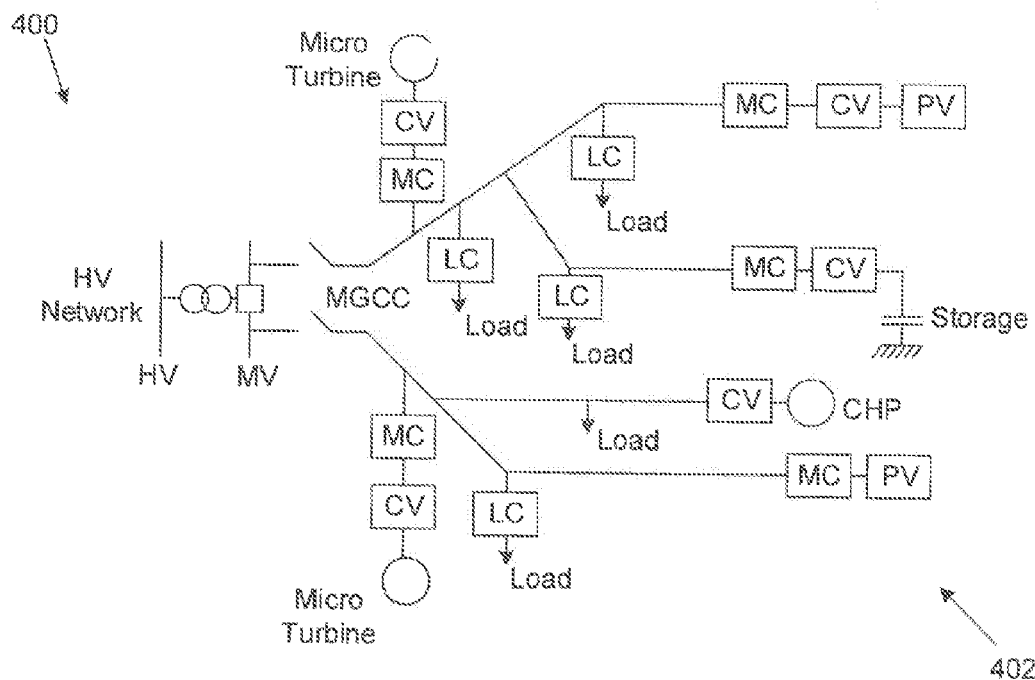
FIG. 4 is a schematic diagram which illustrates a typical micro-grid power network in which embodiments of the invention may be implemented.

FIG. 4 shows an exemplary grid (400) which includes a microgrid (402) having multi-purpose nodes. Examples of these nodes include: conventional loads which absorb power such as heaters, air-conditioners, and the like; and micro generation such as photovoltaic cells (PV), storage (batteries), combined heat power (CHP) and micro turbines. A current compensator system as described herein may be provided at a point of common coupling (PCC) for the optimal injection or extraction of current. The PCC may be any interface between sources and loads in a power network. In one case, the PCC may be where a microgrid (402) is connected to a main grid (400). In other cases, for example, the PCC may be where a photovoltaic cell (PV), a micro turbine, storage, combined heat power or the like is connected to the grid or microgrid.

Thévenin's equivalent theory states that any complicated network such as that illustrated by the schematic can be replaced with a simple circuit with an equivalent resistance, reactance and voltage source.

Figure 5:
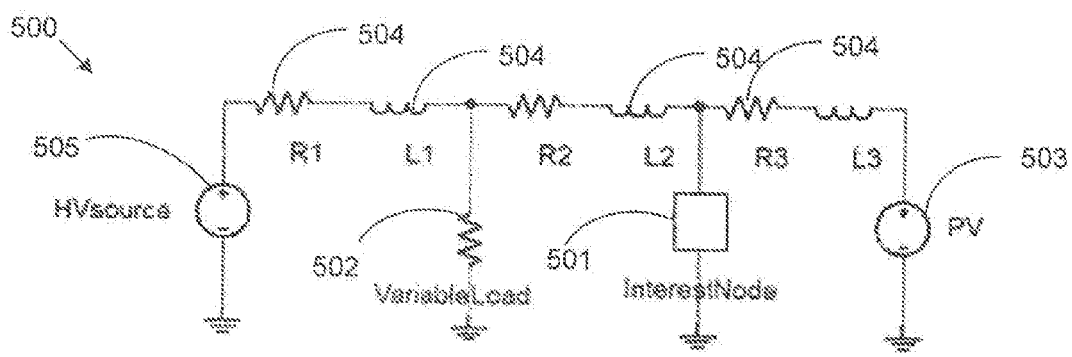
FIG. 5 is a simplified model of the micro-grid of FIG. 4.

This could have been reduced to a Thévenin equivalent circuit using classical network analysis but for the sake of simplicity the validity of the method was simulated on a simpler network (500) as shown in FIG. 5.

This section shows that when the system changes, the Thévenin's equivalent circuit with respect to the PCC changes. Along with this it also shows that when power is injected into a complicated mesh network the same resultant parameters result as when you inject into a simple equivalent model. This has been demonstrated for a single phase, showing how each phase operates effectively independently.

The network as depicted in FIG. 4 was simplified to the network (500) of FIG. 5 with: the loads as variable resistors; a PV node as a voltage source (503); the transmission lines as inductors and resistors (504); and a micro turbine as a variable resistor, or node of interest (501). The simplified micro-grid of FIG. 5 also included a HV source (505) to simulate the HV network.

Figure 6:
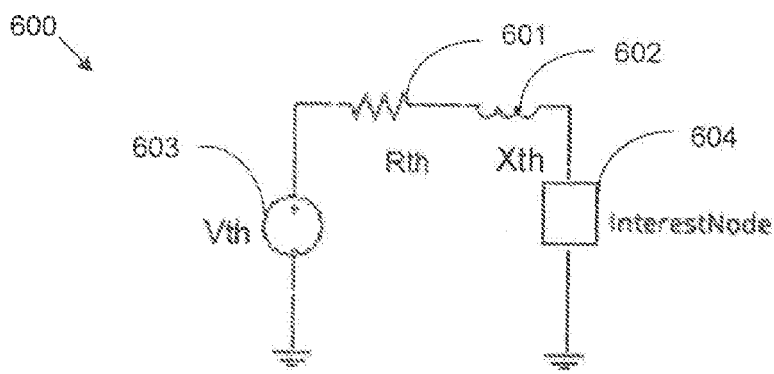
FIG. 6 is a Thévenin's equivalent model of a simplified micro-grid network as depicted in FIG. 5 which illustrates aspects of the invention.

FIG. 6 is a Thévenin's equivalent model (600) of the grid network illustrated in FIG. 5. The Thévenin's equivalent model includes components having related parameters. The components include a Thévenin resistor (601) having resistance $R_{th}$, a Thévenin reactor (602) having reactance $X_{th}$, a Thévenin voltage source (603) having a voltage of $V_{th}$ and an interest node (604).

The Thévenin's equivalent parameters, for example a resistance of $R_{th}$ and a reactance of $X_{th}$, were found using a simple program to compute Thévenin's equivalent parameters for each of the different network behaviours. The line reactances were kept constant. Both schematic networks of FIGS. 5 and 6 were simulated and the voltage at the node of interest (501), (604) was found for each different case. The voltages for both models were compared.

The following were demonstrated for the different states that a typical network could be in:
The default values;
The PV source being disconnected, by making the PV node (503) voltage equal to zero;
The micro-grid being isolated from the grid (blackout), by making the HV source (505) voltage also equal to zero;
The other loads on the network no longer absorbing power but now generating, by changing the Variable load (502) resistance to negative ohms;
The other loads on the network to absorb more power, by changing the Variable load resistance.

The Thévenin's parameters derived by classical circuit theory or using the parameter derivation method by simulation described matched in all the cases. This shows that a single phase of any complex network can be described in terms of its Thévenin's characteristics for the purpose of determining power losses and optimal power reaching its points of consumption.

Consumption and generator nodes were simulated by injecting current and absorbing current in order to calculate the Thévenin's parameters. These currents, which are not part of the compensating currents, may be superimposed when no power is injected as well as when power is already being injected or extracted at a PCC. This may be done to improve the accuracy of the Thévenin parameters in the case where the power introduced was significant with respect to that of the network's.

If there is non-linearity in the network and loads, power may be introduced in steps and Thévenin parameters readjusted if needed in increments in the power delta $P_{th}$ injected or extracted. Alternatively, the whole power $P_{th}$ may be introduced all at once and corrected if needs be by varying the power level by a small margin and repeating the process.

This simulation was done for the case of the micro turbine, but it could have been done just as easily for any node on the network. As power theory states a Thévenin's equivalent can be found for any node in the network.

Network Characteristic Computational Method

An inverter is capable of injecting a current in phase with the voltage, even as the voltage changes. The injected current causes the voltage to change. The magnitude of the fundamental voltage will change by $\Delta V$, which is determined by the current injected and the $R_{th}$ and $X_{th}$ parameters on the network.

Any node in the network has an equivalent Thévenin's equivalent model for each wire, representing the whole network. Although the phase of the voltage is unknown, as the current is injected in phase, the phase of the voltage at the PCC can be taken as the reference and thought of as zero phase angle.

FIG. 7 shows a schematic diagram for an exemplary Thévenin network (700). The Thévenin network (700) includes a Thévenin source (701) having a voltage $V_{th}$, a Thévenin resistor (702) having a resistance $R_{th}$, a Thévenin inductor (703) having reactance $X_{th}$. The Thévenin network (700) is with respect to a point of common coupling (PCC), in this case, where an inverter (704) is connected to the network. In what follows, voltage at the inverter (704) is denoted as $V_{inv}$ and the magnitude of current injected by the inverter is $I_{inv}$.

The Thévenin parameters may be calculated using various different methods. A method is described in detail below; however, other methods may include measuring the currents and phase angles under two or more different conditions.

FIGS. 8A and 8B show a phasor diagram (800) for positive current injection and a phasor diagram (850) for negative current injection at the inverter (704). The phasor diagrams (800) and (850) show that the Thévenin's resistance can be calculated by injecting a current in phase with the voltage and at the next instance a negative current with the same magnitude. The voltage drops over the inductor cancel and the voltage drops over the resistors add together.

Therefore, firstly a fundamental current in phase with the voltage is injected (or DC in case of DC) and then a current being anti-phase (180 degrees out of phase) with the voltage is injected. The magnitudes of the two voltages Vin+ and Vin− are measured in each of the above cases. The voltages that are measured may be the fundamental voltages to accommodate non-sinusoidal currents. If sinusoidal currents are used, then the voltage may be used.

The Thévenin resistance can then be calculated:

$$R_{th} = \frac{V_{in+} - V_{in-}}{2I_{inv}} \quad \text{(Equation 1)}$$

In the phasor diagrams, it is seen that $R_{th}$ can be calculated. It is shown in the phasor diagram that while injecting a positive current $I_{POS}$ the voltage at the inverter (704) which is taken to be the PCC is labelled as $V_{in+}$. On the other hand while taking a negative current $I_{NEG}$ the voltage at the inverter (704) is labelled as $V_{n-}$. Subtracting the voltages at the inverter ($V_{in+} - V_{in-}$) found at each different time period, will result in $2R_{th}I_{inv}$. The $X_{th}I_{POS}$ cancels with the $X_{th}I_{NEG}$ and the $R_{th}I_{POS}$ adds to the $R_{th}I_{NEG}$, since the magnitude of the currents are the same ($|I_{POS}|=|I_{NEG}|=I_{inv}$). Therefore, the Thévenin's resistance can be found by simply dividing by two times the magnitude of the injected current (Equation 1).

In the same way, the Thévenin's reactance can be calculated with this method, the difference being that the injected currents are now at 90 degrees phase shift relative to the voltage. The reactance is also calculated using (Equation 1) with the voltages at the respective injection times:

$$X_{th} = \frac{V_{in+90deg} - V_{in-90deg}}{2I_{inv}} \quad \text{(Equation 2)}$$

A power electronics simulation package has been used to demonstrate how the Thévenin's parameters can be determined in a single Thévenin's circuit. In order to simulate an inverter, simple sinusoidal current source that injects current in phase with the voltage was used in the simulation model.

For the reactance calculation of the network, the current source model follows the voltage with a 90 degree phase shift.

FIG. 9 shows a schematic diagram (900) for an exemplary Thévenin network similar to that of FIG. 7, differing in that a number of probes have been included for measuring various parameters. The probes include Probe 1 (910) and Probe 4 (913), which are used to control the injection of currents with respect of the voltage at the PCC whilst determining the Thévenin parameters. Probe 2 (911) and Probe 3 (912) also measure the same voltage and current at the PCC but are used for the purpose of calculating the currents. The Thévenin network includes a Thévenin source (901), a Thévenin resistor (902), a Thévenin reactance (903) and an inverter (904).

In a first step a current was injected in phase with the voltage and the maximum voltage was recorded using Probe 2 (911). After 5 cycles the same magnitude current but now at 180 degrees out of phase was injected and again the voltage peak was recorded. Finally using an equation block the $R_{th}$ was calculated using (Equation 1) and displayed in a digital view block.

In practice, instantaneous values of voltages and currents may be sampled and held for the duration of at least a 50 Hz cycle and used to calculate the Thévenin parameters as well as the currents needed to be injected.

This method was repeated for all the typical parameters of a benchmark power network and the actual value and the calculated value were recorded.

This process was repeated for the calculation of the reactances. The only alteration that was done was that the current source was first at +90 degree phase shift and then −90 degree relative to the voltage at the PCC. After which the same equation blocks were used and the results were imported into a table.

It is well known from classical power theory that the Thévenin's model can represent any complex network. It has also been shown that the above method correctly calculates the Thévenin's parameters with respect to any PCC, therefore these parameters may be used to calculate the current magnitude and angle required so as to ensure that the power injected into the network at any PCC reaches its destination (where it is consumed) with minimum losses.

An inverter may be connected to a three-wire system like in common power systems and compute the characteristic of each of the networks with very little computation time.

Current Compensation Method Using Source and Inverter Voltages

It has previously been shown that a whole complicated mesh network may be represented as a simple Thévenin's equivalent network for each phase. If there is power available from any source (PV, wind turbine etc.) at any node it is desired to know how much power to put onto each wire so as to transmit maximum power to where it can be used (i.e. Thévenin voltage source) or in other words so that it reaches its destination with minimal losses. The current injection method does this.

However, in order to inject current so as to achieve minimum losses, it must be determined whether either the equivalent Thévenin voltage or the voltage at the point of connection must be used in the method's current calculation. It has been found that the Thévenin equivalent voltage must be used in the calculation and not the voltage at the point of injection or consumption. The reason being that the Thévenin equivalent voltage is invariant with respect to the magnitude of the current injected or extracted which will then be in accordance with the Malengret and Gaunt method as published in the above-referenced papers. This also implies that the injected or extracted current will be in phase with the Thévenin equivalent voltage but not the voltage at the point of connection of the compensator device.

Figure 10:
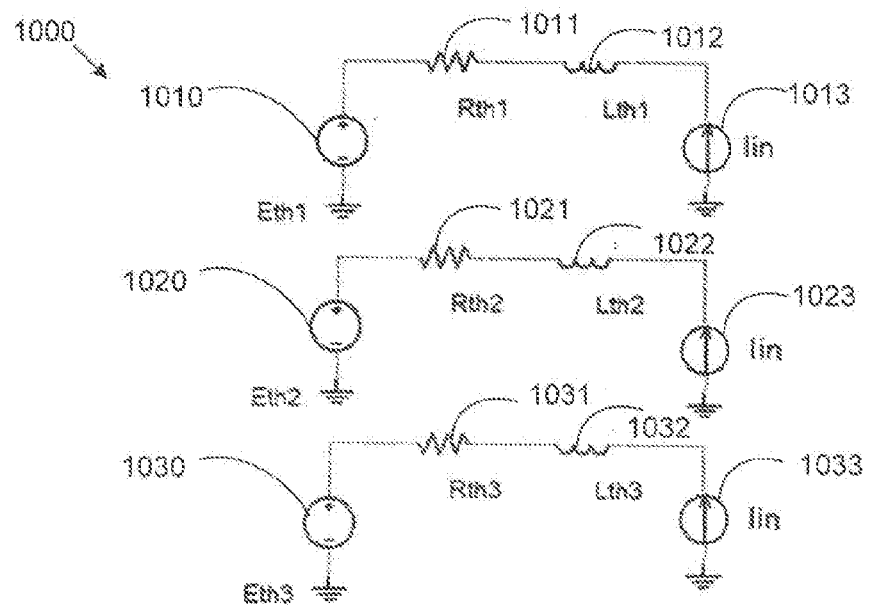
FIG. 10 is a schematic diagram of a three phase four wire Thévenin's system according to embodiments of the invention.

For example, a three phase system with a zero resistance neutral can be represented simply by three Thévenin circuits. FIG. 10 illustrates a three phase, four wire Thévenin system (1000). The system (1000) includes three Thévenin equivalent circuits, each having various Thévenin components. Each Thévenin equivalent circuit has a Thévenin source (1010, 1020, 1030), a Thévenin resistor (1011, 1021, 1031), a Thévenin reactance (1012, 1022, 1032) and an inverter (1013, 1023, 1033).

Figure 11:
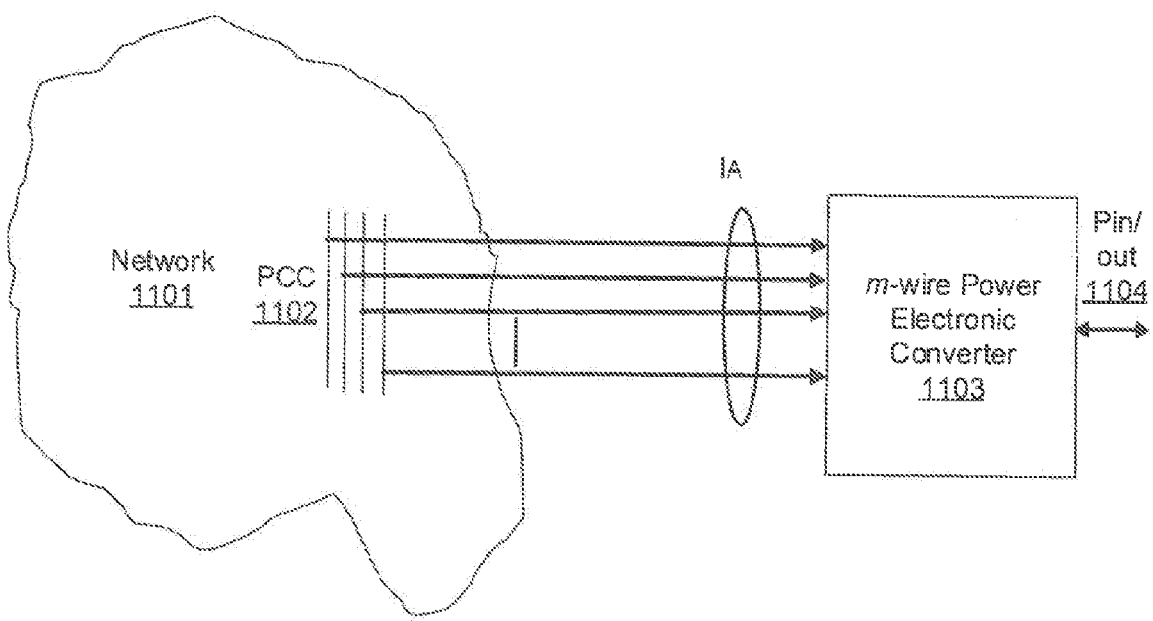
FIG. 11 is a block diagram of an exemplary power network having an m-wire power electronic converter according to embodiments of the invention.

FIG. 11 is a block diagram of an exemplary power network (1101) having an m-wire power electronic converter (1103) according to embodiments of the invention. The converter (1103) is connected to the power network at a PCC (1102) and is operable to convert injected or extracted power Pin/out (1104) to an optimal current magnitude and/or phase to or from the network (1101) at the PCC (1102).

Figure 12:
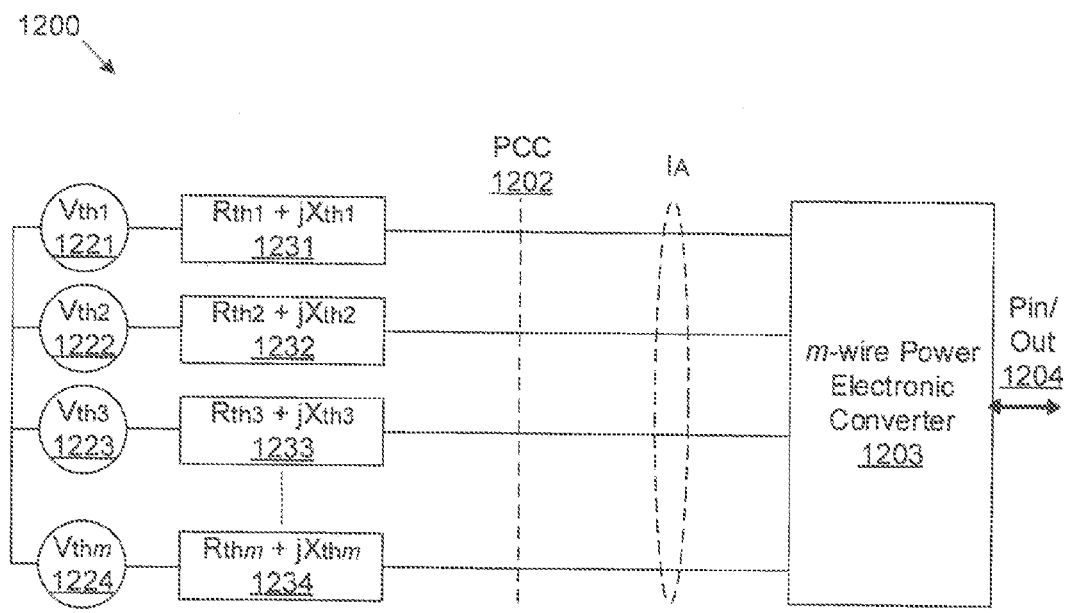
FIG. 12 is an m-wire Thévenin equivalent circuit of the network of FIG. 11.

FIG. 12 illustrates an m-wire Thévenin equivalent circuit (1200) at a PCC (1202) with an m-wire power electronic converter (1203), or compensator, of FIG. 11. The circuit (1200) includes Thévenin resistances $R_{thm}$ and reactances $X_{thm}$ (1231, 1232, 1233, 1234) for each of the m wires and a Thévenin source $V_{thm}$ (1221, 1222, 1223, 1224) for each of the m wires.

Known current compensation methods are described in the Malengret and Gaunt papers which will now be described with reference to the FIGS. 11 and 12. This method will be applied to the exemplary network and equivalent circuit of FIGS. 11 and 12, differing in that the dynamically determined Thévenin parameters according to embodiments of the invention are used instead of fixed physical values as proposed in the Malengret and Gaunt papers.

In a first step of the current injection or compensation method as described in the Malengret and Gaunt papers and adapted according to embodiments of the invention, the Thévenin's voltages are changed to a weighted Thévenin's voltage vector dependent on the Thévenin's resistances (Equation 3). The Thévenin's voltages and resistances of each of the wires at the PCC as illustrated in FIGS. 11 and 12 are referred to as $V_{th1}, V_{th2}, \ldots V_{thm}$ and $R_{th1}, R_{th2}, \ldots R_{thm}$ respectively.

$$v'_{th} = \left( \frac{v_{th1}}{\sqrt{R_{th1}}}, \frac{v_{th2}}{\sqrt{R_{th2}}}, \frac{v_{th3}}{\sqrt{R_{th3}}}, \ldots \frac{v_{thm}}{\sqrt{R_{thm}}} \right) \quad \text{(Equation 3)}$$

(This is referenced to Equations 9 to 12 in Paper 1.)
where $v_{th1}, v_{th2}, \ldots v_{thm}$ are the Thévenin voltages to a referenced to a resistance weighted null reference point. Voltage referencing is done as explained in Paper 1, where the voltages to be used are adjusted values based on the resistance weighted null reference point, and are not the raw measurements. The resistance weighted null reference point is derived from the sum of all the measured voltages from a common reference (one of the wires), each divided by the respective wire resistance, the total being divided by the sum of the conductances of the wires. Raw measurements cannot give true Thévenin equivalent parameters. $R_{th1}, R_{th2}, \ldots R_{thm}$ are the equivalent Thévenin resistances of each of the wires as determined previously and as illustrated in the circuit (1200) of FIG. 12.

In a next step, the total Thévenin power (of all wires) $P_{th}$ is calculated as per Equation 13 below whose derivation is described later in this description. The specific amount of power at the PCC, $P_{PCC}$, is known and used in the equation to determine an optimal additional total Thévenin power $P_{th}$.

The equation has two solutions for $P_{th}$, one for extracted power and one for injected power. The power which is to be extracted is the greater of the two solutions for $P_{th}$. The power which is to be injected is the lesser of the two solutions for $P_{th}$.

$$P_{th} = \frac{-\|V'_{th}\|^2 \pm \sqrt{\|V'_{th}\|^4 + 4P_{PCC}\|V'_{th}\|^2}}{2} \quad \text{(Equation 13)}$$

It is important to note that $P_{th}$ is calculated without determining the optimal currents. An iterative method for calculating $P_{th}$ may be used due to non-linearity and the influence injecting power on the network may have on the Thévenin parameters; however $P_{th}$ as calculated above may be used to commence with. The iteration may stop after a certain accuracy of $P_{th}$ has been obtained.

In a following step, the constant $k_A$ is calculated using $P_{th}$ divided by the norm squared of the weighted voltage vector (Equation 4).

$$k_A = \frac{P_{th}}{\|V'_{th}\|^2} \quad \text{(Equation 4)}$$

(This is referenced from Equation 17 in Paper 2.)
where $\|V'_{th}\|^2$ is the square of the norm of Thévenin weighted instantaneous voltage $v_{th}$' referenced to the weighted voltage as described in Paper 2.

In a following step, the weighted current vector is computed by multiplying the constant $k_A$ by the weighted voltage vector (Equation 5)

$$i'_A(t) = k_A V'_{th}(t) \quad \text{(Equation 5)}$$

(This is referenced from Equation 17 in Paper 2.)
where "'" represents resistance weighted vector value as described in Malengret and Gaunt papers.

Finally, the current vector that needs to be injected or extracted is determined to be:

$$i_A(t) = i'_A(t) R_{th}^{-1/2} \quad \text{(Equation 6)}$$

The method described above differs in four aspects to those of the published papers as it uses the weighted Thévenin voltage instead of the weighted voltage at the point of connection, the Thévenin power $P_{th}$ instead of the power at the point of connection as well as the calculated Thévenin resistances instead of the actual wire resistances and the Thévenin reactances for determining the phase angle of each wire currents. The published paper assumes the voltages at the point of coupling to be invariant vis-à-vis the injected currents which this method does not. While Paper 3 acknowledges specifically that the published approaches in papers 1, 2 and 3 are assumed constant, but will actually change, no solution is put forward for accounting for this change. Hence the need to use an alternative set of parameters was required. Embodiments described herein identify and utilise these parameters.

The use of Thévenin resistance, Thévenin reactance, Thévenin voltage and Thévenin power instead of the wire resistance, ignoring the reactance and using the voltage and power at the point of coupling provides significant advantages. In particular, the deficiency of the assumption, which was recognized in Paper 3 to be an invalid assumption, is overcome.

Figure 13:
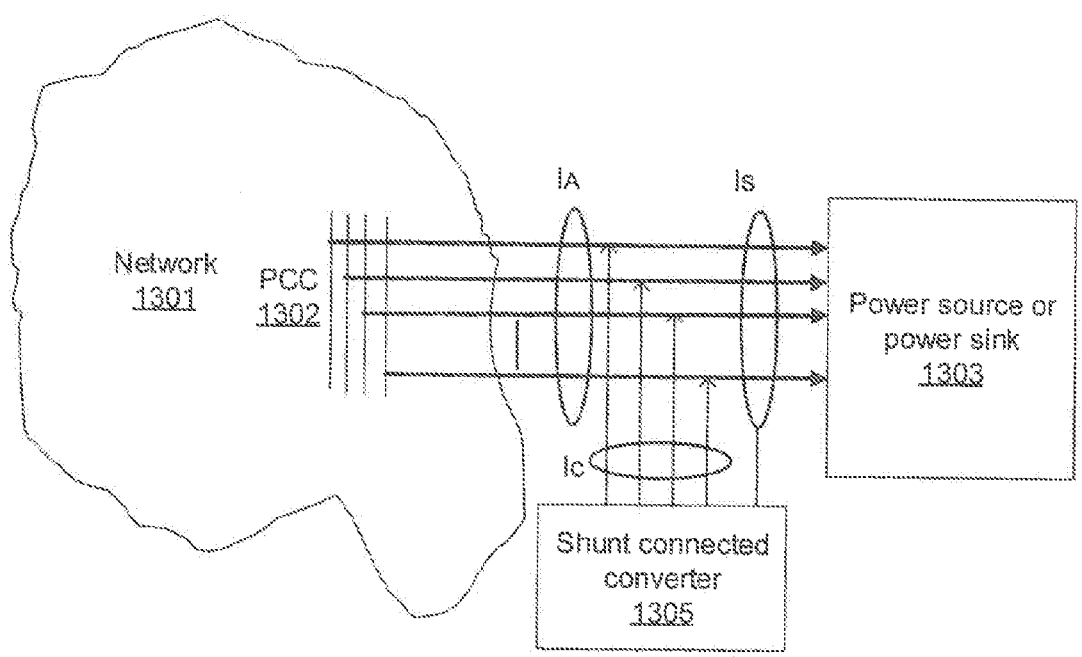
FIG. 13 is a block diagram of another exemplary power network having a power source or power sink.

FIG. 13 is a block diagram of another exemplary power network (1301) having a power source or power sink (1303). The power source or power sink (1303) is connected to the power network at a PCC (1302) and either injects power into or extracts power out of the network (1301). FIG. 13 differs from FIG. 11 in that the power injected or extracted by the power source or power sink (1303), as the case may be, is not injected or extracted optimally as per methods described herein.

Instead, the same optimal current injection or extraction can be obtained with a shunt connected (parallel) converter (1305), or shunt active filter, by adding only the difference needed between the injected or extracted currents ($I_S$) and the required optimal currents ($I_A$). The shunt connected converter (1305) only needs to inject the difference ($I_C$) between the desired currents and that of a typical supply or load. In some cases, the shunt connected converter (1305) may only process the reactive component of power and not the active component of power while in other cases, for example where a filter with storage is provided, an active component of power could be transferred according to the wire resistances. In cases where storage (e.g. batteries, capacitors, etc.) is provided with the shunt connected convertor (1305), then the active component of power flowing into or out of the PCC (1302) may be different from that of the power flowing into or out of the power sink (1303) for short periods.

The required currents ($I_C$) may be injected with no real power (except possibly for minimal losses) and thus may introduce only non-active power.

Figure 14:
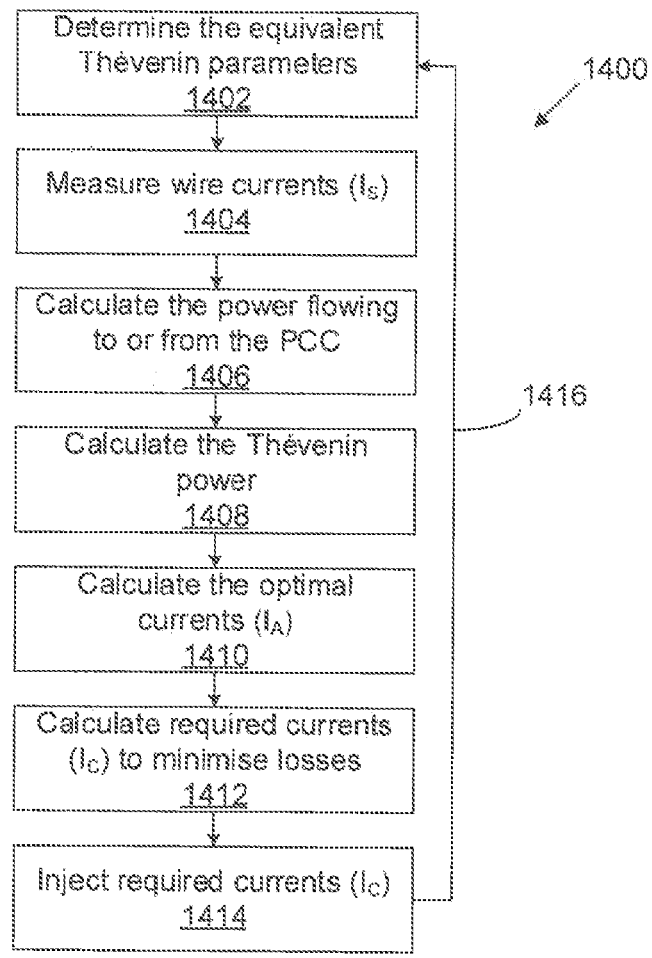
FIG. 14 is a block diagram which illustrates a method which may be conducted at a shunt connected converter such as that of FIG. 13.

The shunt connected converter (1305) is advantageous in that it may be substantially smaller, cheaper and more efficient. FIG. 14 is a block diagram which illustrates a method which may be conducted at a shunt connected converter such as that of FIG. 13.

At a first step (1402), the method may determine the equivalent Thévenin parameters with respect to PCC. This step (1402) may include a step of measuring the current and voltage of each wire at different instances in time and using these measurements to determine the Thévenin parameters, for example as discussed above in relation to FIGS. 7, 8A and 8B, or according to any other suitable method. At a next step (1404), the method may measure wire currents ($I_S$) of the power source or power sink. The method may then, in a following step (1406), calculate the power flowing to or from the PCC. At a next step (1408), the method may calculate the Thévenin power ($P_{th}$), for example, as per Equation 13 described previously. The method may then in a following step (1410) calculate the optimal currents ($I_A$) required in order to minimise losses, for example as per Equation 6 above. The difference between the optimal currents ($I_A$) and the actual wire currents ($I_S$) is then calculated to give the required currents ($I_C$) to minimise losses in a next step (1412). In a following step (1414), the required currents ($I_C$) are injected by the shunt connected converter. The method may repeat (1416) as necessary for accuracy and dynamic changes of the system.

In the case where power needs to be processed (e.g. DC to AC) a series connected converter would be used and would produce the required optimal current. However in many cases where the power is injected by a generator, existing commercial converter, a load etc., directly connected to the PCC, the shunt connected converter could be used to optimise the currents. This would result in reduced transmission losses in the network.

Shunt connected converter can also be introduced at any point in a network and could, for example, be placed at the beginning or end of a transmission line, at different nodes of a power system, as well as at any convenient point between network nodes.

Permutation Analysis of Power Distribution for a Three-Wire Dower System

In common three-wire power networks, there are three available wires to each node. As previously shown, each of these three wire's model characteristics (source voltage and impedance) change in time and this changing characteristic can be calculated with current injection and a Thévenin's resistor calculation method as previously described. Using permutation analysis the injected power on each wire to get the maximum power at the source may also be found in simple cases. After finding the best, or optimal result (i.e. maximum power at $P_{th}$), the current compensation method is used and the results compared as a proof of concept.

Figure 15:
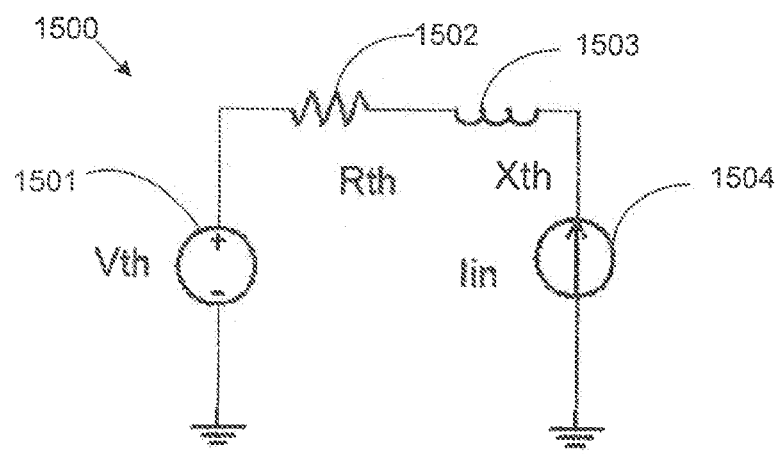
FIG. 15 is a schematic diagram of a single phase of the Thévenin's model for a network according to embodiments of the invention.

FIG. 15 illustrates yet another schematic (1500) of a single phase of the Thévenin's model for a network. The Thévenin network (1500) includes a Thévenin source (1501) having a voltage $V_{th}$, a Thévenin resistor (1502) having a resistance $R_{th}$, a Thévenin reactance (1503) having an reactance $X_{th}$ and an inverter (1504) which receives a current ii, of the Thévenin circuit.

For a simple exemplary case in which the network voltages and currents are sinusoidal and no inductance exists and where it is required to find the optimal wire currents solution that gives least transmission losses when injecting power at the PCC, the following process can be done.

It is assumed that the power available ($P_{PCC}$) from any source (photovoltaic array, batteries etc.), $V_{th}$ and $R_{th}$ are known for each of the wires. From these, the power that reaches the Thévenin voltage of each wire (effectively the point of consumption) when injecting power can be calculated by:

$$P_{th} = V_{th} I_{th} \qquad \text{(Equation 7)}$$

$$V_{PCC} = V_{th} + R_{th} I_{PCC} \qquad \text{(Equation 8)}$$

Substituting (Equation 8) into (Equation 7) and since the current at the PCC and Thévenin point are the same and solving for the current using the root equation gives:

$$P_{PCC} = V_{th} I_{PCC} + /- R_{th} I_{PCC}^2$$

$$I_{PCC} = \frac{-V_{th} +/- \sqrt{V_{th}^2 - 4R_{th}(-P_{PCC})}}{2R_{th}}$$

Therefore the power that reaches or is extracted from the Thévenin equivalent voltage is:

$$P_{th} = V_{th} I_{PCC} \qquad \text{(Equation 9)}$$

The power that reaches the Thévenin point of each wire can then be calculated by using the above two equations by first calculating the current of each wire using the assigned power to each wire by the permutation approach and then calculating the power that reaches that specific Thévenin wire point using Equation 9. The total Thévenin power can then be found by adding all the individual wire Thévenin powers.

This exercise may also be carried out when exporting using the appropriate signs in the calculation of $P_{PCC}$ and $I_{PCC}$.

Power in is referred as power at the PCC and becomes negative when extracting. $P_{th}$ remains in either case and will be determined by $I_{in}$ magnitude and sign. These equations only apply to permutation analysis as permutation analysis assumes a split of power between each wire for each of the cases (splits).

The permutation approach consisted of forming an array of the power that is to be injected into each wire at the PCC point. In an exemplary scenario, 1000 Watts may be available to inject into a network. With steps of 100 Watts (i.e. 10%) on each line starting at 0 Watts on line one and line two (therefore all 1000 Watts on line 3) the power that reaches the equivalent Thévenin voltage (effectively the consumer) of each wire was calculated each time using the found characteristic (remains constant) and Equation 9 above. All the total Thévenin power obtained for each permutation were recorded and mapped into a three-dimensional area graph displaying the total power reaching the Thévenin point (by summing the respective power injections on each wire). The permutation that gave the maximum was then considered (or zoomed in on) with steps of 10 Watts (i.e. 1%) so as to obtain a more accurate maximum with a resolution of 1%. In a spreadsheet the maxima found using the permutations was compared with the current compensation method.

The maximum power within a 10% accuracy found using the tables with steps of 100 Watts that reached the point of consumption (Thévenin equivalent voltage) was slightly less than the maximum found using the current compensation method. It was only once the method "zoomed in" using smaller permutation steps of 10 Watts that a maximum of almost exactly the optimal power found using the method was found.

In conclusion, the currents found for each wire using the current compensation method correlate directly to the optimal power ratios on each wire in the permutation analysis. The current compensation method developed with known network characteristic can be used to calculate the currents for each wire for the most efficient power flow.

Optimal Dower Flow with Known Injection Dower

In this section, a solution is found to formulate the optimal power that will be received by the consumer with known power injected at a PCC.

In previous sections, it has been found that the current compensation method can determine the currents needed to achieve optimal transmission so that for any specific power available the maximum power reaches the consumers.

A method for calculating the power that reaches the consumer follows.

From original theory after substituting P with $P_{th}$ and $v'_2$ with $v'_{th}$, the weighted current vector that gives minimum losses is:

$$I'_A(t) = \frac{P_{th}}{\|V'_{th}\|^2} v'_{th}(t) \quad \text{(Equation 10)}$$

From Paper 2 the sum of the power losses of all the wires are known to be $\|i'\|^2$, therefore squaring (Equation 10) gives the power losses for this 3 wire system as:

$$\text{power losses} = \quad \text{(Equation 11)}$$

$$\|I'_A\|^2 = \frac{P_{th}^2}{\|V'_{th}\|^4} V'_{th}(v_{th1}^2 + v_{th2}^2 + v_{th3}^2) = \frac{P_{th}^2}{\|V'_{th}\|^2}$$

Therefore, for the case of injecting current, the power at the Thévenin point is the power injected minus the losses calculated above (Equation 11). For the case of extracting current, the power at the Thévenin point is the power injected added to the losses calculated above (Equation 11):

$$P_{th} = P_{PCC} - / + \frac{P_{th}^2}{\|V'_{th}\|^2} \quad \text{(Equation 12)}$$

Solving (Equation 12) for $P_{out}$ using the quadratic formula gives two solutions, one for injecting and one for extracting power (the minus sign applies to injecting):

$$P_{th} = \frac{-\|V'_{th}\|^2 \pm \sqrt{\|V'_{th}\|^4 + 4P_{PCC}\|V'_{th}\|^2}}{2} \quad \text{(Equation 13)}$$

Being able to determine the optimal amount of power injected into any PCC that reaches the network for useful purpose (without actually calculating the optimal currents) from the Thévenin equivalent circuit has advantageous applications. The same applies to knowing how much power is required to export power to a particular PCC.

For example a system operator would be able to calculate the power needed to be injected at each of storage or supply point (PCC) so that a specific additional amount of power needed reaches the consumer (the Thévenin voltage) and therefore make a more informed decision as to which point should be called on to deliver the required power and calculate the transmission power losses associated with each of the possible PCCs. This could be of importance in selecting bidders after requesting price of power from various import or export power bidders on a network.

As the current compensation method requires the voltages to be time-invariant, the phase ($\delta$) from the node voltage that the inverter must inject the current in must also be calculated. From this, the phase of the source voltage and current can be made to be zero.

$$|V_{Pcc}| < \delta = Z_{th}I_{PCC} + V_{th} = R_{th}I_{PCC} + jX_{th}I_{PCC} + V_{th}$$

The angle of the voltage is calculated as:

$$\delta = \arctan\left(\frac{X_{th}I_{PCC}}{R_{th}I_{PCC} + V_{th}}\right)$$

Therefore from this the phase angle of the AC currents of each of the wires at the PCC is known (in the case of DC this parameter would not be needed).

It should be noted that since the Thévenin voltage point has characteristics of a pure voltage source (no resistance or inductance) the injected currents must be in phase with the Thévenin equivalent voltage (as opposed to the voltage at the PCC) so as to ensure that the ($I^2R$) losses of the equivalent wires (representing the network) are minimum. The known methods of compensation proposed by Malengret and Gaunt are therefore only optimum if the equivalent Thévenin invariant voltages are used in the calculation (as opposed to the PCC point) for one to get minimum transmission losses which was the proposed definition of unity power factor.

In one embodiment, Thévenin power $P_{th}$ may be calculated directly using Equation 13 which does not need to know the currents and is based on the on a specific amount of power at the point of common coupling and the determined Thévenin parameters.

In an alternative embodiment, an iterative method of determining Thévenin power $P_{th}$ may be provided. The optimal wire currents may be calculated as previously described using Equation 10 and Equation 6. The total power losses may then be determined by the sums of $R_{th}I_{in}^2$ for each of the wires. $P_{th}$ may then be obtained by deducting the total wire losses from known $P_{PCC}$. The process may be repeated until $P_{th}$ converges to sufficient accuracy.

Figure 16:
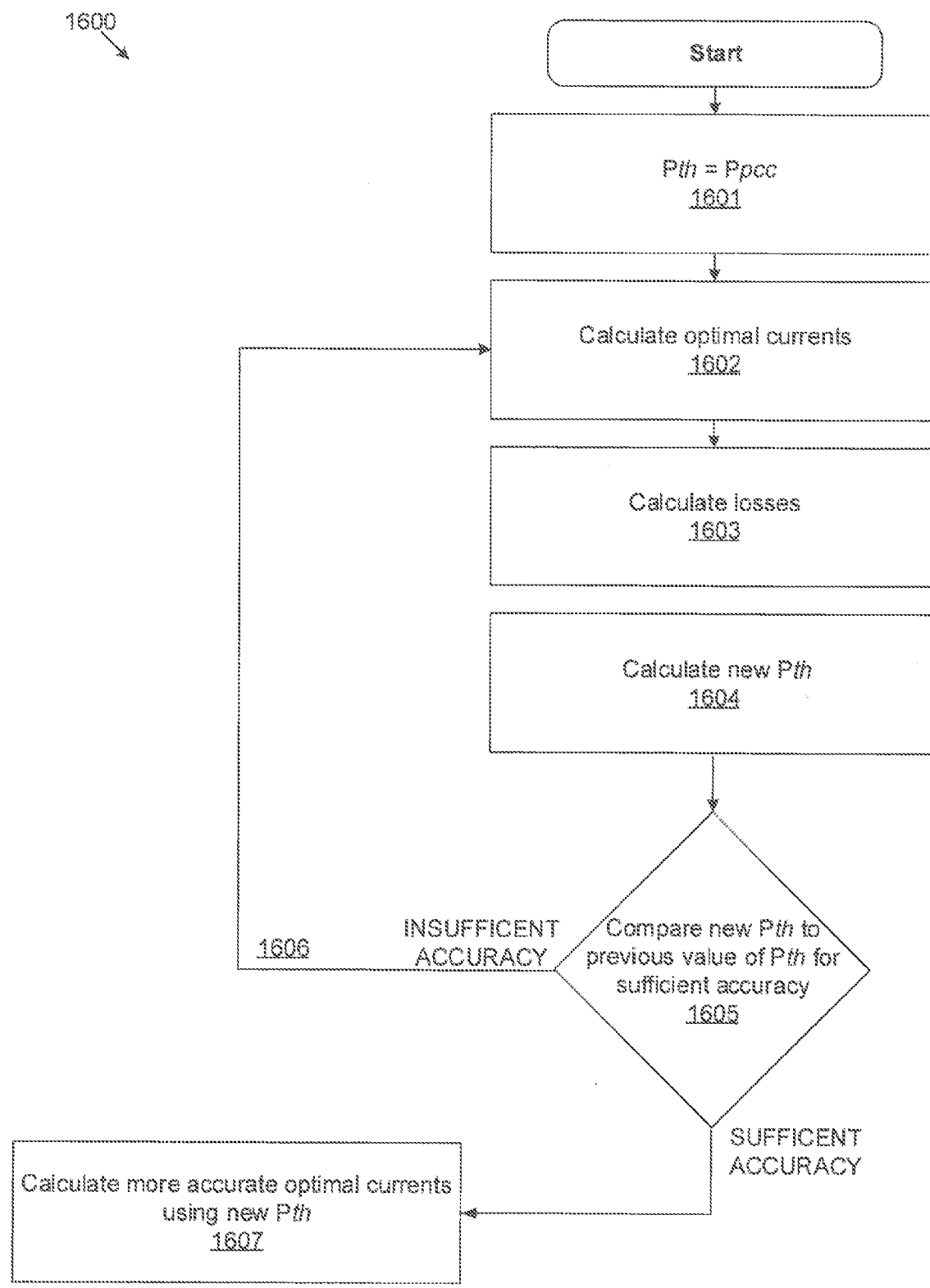
FIG. 16 is a flow diagram which illustrates a method according to embodiments of an aspect of the invention; and, FIG. 17 illustrates an example of a computing device in which various aspects of the disclosure may be implemented.

FIG. 16 is a block flow diagram which illustrates a method (1600) according to embodiments of the invention. The method (1600) is a verification proof of concept of Equation 13 or a method of determining the optimal currents without the use of Equation 13.

In a first step (1601), the power which reaches the source, i.e. "Thévenin power or $P_{th}$" is set to the input power ($P_{pcc}$). In a second step (1602), the optimal currents are calculated using Equations 10 and 6 after which the line losses are calculated by using the sums of all the wires losses (i.e. $R_{th}I_{in}^2$) in a next step (1603). In a following step (1604), $P_{th}$ is calculated by deducting the sum of the wire losses from $P_{pcc}$ and is then compared, in a next step (1605), to previous value of $P_{th}$ to determine if it is sufficiently accurate. If not, the method loops (1606) to the second step (1602).

If the new value for the Thévenin power $P_{th}$ is sufficiently accurate, it is then used to determine the optimal currents more accurately at a next step (1607).

The current vector which is required to supply the determined optimal input power may then be calculated using methods according to embodiments of the invention.

The results found from the iteration method were then compared with the results from the calculation method (Equation 13) above. The angle in which the inverter must inject the current was also calculated easily in both calculation steps.

The results above show a direct correlation between the methods. Both have the same network characteristics and both output the same output power best solution. This shows that these methods can be used by any inverter to calculate the optimal power flow. The results show that using the calculated power out, the current compensation method can be used and in fact it is true that you get the power injected that you started with. The method requires the voltages to be time-invariant, and therefore the currents are in phase with the source voltages. As the inverter that is injecting the power does not know the phase of the voltages, it can only inject power at a phase shift away from the voltage at the inverter.

In conclusion, two methods can be used to calculate the output power when a predetermined amount of power is accessible at the inverter side. For an inverter the calculation method would be more desirable as it will use less computational time, as these values would need to be calculated in a very short time period (one or two cycles of voltage waveform). The phase shift of the injected currents is easily calculated and optimal power injection is found.

Current Compensation Simulation for a Typical Network

The purpose of this section is to demonstrate the current compensation method in a typical network. Three typical networks were simulated.

In previous sections it has been shown that a typical network can be represented as a simple Thévenin's equivalent network. It also has been shown that within the capabilities of an inverter the parameters can be calculated at any node on the network. With knowing these parameters the optimal current vector can be found, for getting the most power to the source in the case of injection and the least power from the source when taking power. The model does not represent the complete load flow of the network.

It can be concluded from these results that there is a correlation between the Thévenin's equivalent model's optimal power and a typical network model. When injecting power, the power does not necessarily go to the point of consumption as it also reduces the existing transmission losses before injecting or extracting power from the network. This method provides a way for an inverter to find the current vector to have the greatest influence on the reduction of network power requirements. In the case of using equal current and injecting currents in phase with the voltages will not reduce the power needed by the network to the minimum that can be achieved when injecting or extracting power at a point of consumption or generation of power.

Conclusions

The sections above explain and demonstrate step by step the method for injecting or taking power optimally for an inverter at any node. It is shown that in typical networks even though they are designed to be balanced, in practice they generally found not to be. Therefore at any node each of the wires will have different voltage and impedance characteristics and therefore power on that wire will be transferred differently. It was also shown that a simple 3 element Thévenin's equivalent model of a network can be found for each corresponding nodes (or wires) to which a converter is connected.

A method has been proposed to calculate the parameters of a simple Thévenin's network equivalent for each of the wires to which a converter is connected, therefore it can be concluded that any multiple m-wire network characteristics can be found. Using a method recently published for a current compensation method for known resistance, voltage and power, it is demonstrated that with a typical network the method determines the current vector which gives rise to optimal, total power flow at minimal transmission losses.

It was also shown that, since the impedance and Thévenin parameters of network wires can be derived by this method or others, not only can the optimal power on each wire be calculated but also the power lost and the power that will reach the desired destination point. In most situations, the node is a load and will be taking, or consuming power. As it has been shown that this method works for injecting and taking power, it can be applied to this scenario as well and an accurate method of measuring the required power for a load, including associated optimal line losses can be found.

Therefore it has been shown that it is feasible to apply this current injection or extraction method with the resistor calculator method in inverters for optimal power flow into or out of a network.

The implication of being able to inject optimally currents dynamically into a multi-wire system for minimum transmission losses is of great significance internationally in the application of smart grid as well as many other applications such as optimal dispatch of power, measurement and instrumentation definitions of power factors, stability of network, optimal load flow etc.

The described method and system may be used in the following applications:

Dispatching conventional or renewable energy sources more efficiently into a network.

Receiving power into a storage device or at a consumer point.

Making informed decisions in selecting the best generation point or storage point. For example, where the control centre management system of a network has a choice between various potential dispatch or storage points.

Power factor compensation at any load node on the network using reactive power by redistributing the current between the phases. This can also be achieved without real power.

Measurement and instrumentation including better new power factor definitions and tariff applications.

Figure 17:
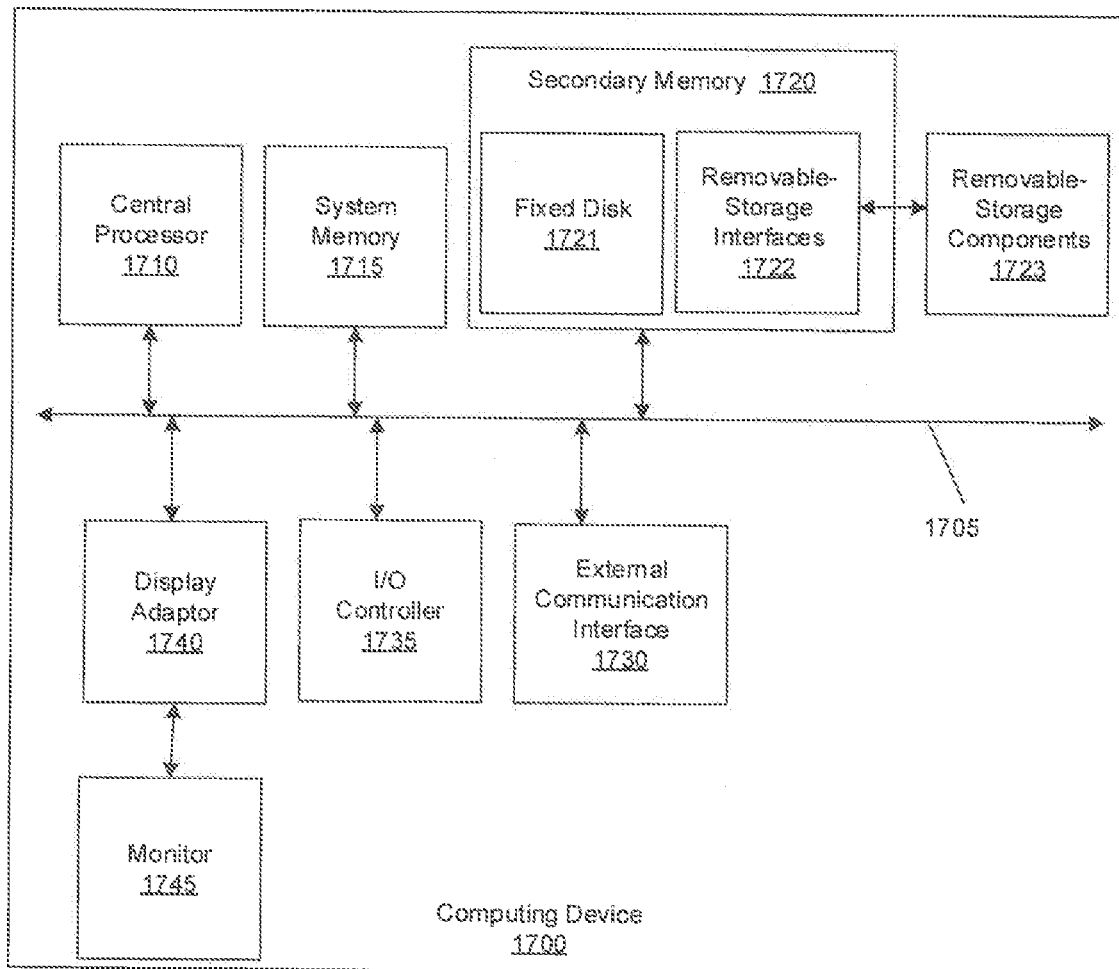

FIG. 17 illustrates an example of a computing device (1700) in which various aspects of the disclosure may be implemented. The computing device (1700) may be suitable for storing and executing computer program code. The various participants and elements in the previously described system diagrams may use any suitable number of subsystems or components of the computing device (1700) to facilitate the functions described herein.

The computing device (1700) may include subsystems or components interconnected via a communication infrastructure (1705) (for example, a communications bus, a crossover bar device, or a network). The computing device (1700) may include at least one central processor (1710) and at least one memory component in the form of computer-readable media. The memory components may include system memory (1715), which may include read only memory (ROM) and random access memory (RAM). A basic input/ output system (BIOS) may be stored in ROM. System software may be stored in the system memory (1715) including operating system software. The memory components may also include secondary memory (1720). The secondary memory (1720) may include a fixed disk (1721), such as a hard disk drive, and, optionally, one or more removable-storage interfaces (1722) for removable-storage components (1723).

The computing device (1700) may include an external communications interface (1730) for operation of the computing device (1700) in a networked environment enabling transfer of data between multiple computing devices (1700). Data transferred via the external communications interface (1730) may be in the form of signals, which may be electronic, electromagnetic, optical, radio, or other types of signal. The external communications interface (1730) may enable communication of data between the computing device (1700) and other computing devices including servers and external storage facilities.

Computer-readable media in the form of the various memory components may provide storage of computer-executable instructions, data structures, program modules, and other data. A computer program product may be provided by a computer-readable medium having stored computer-readable program code executable by the central processor (1710). A computer program product may be provided by a non-transient computer-readable medium, or may be provided via a signal or other transient means via the communications interface (1730).

Interconnection via the communication infrastructure (1705) allows a central processor (1710) to communicate with each subsystem or component and to control the execution of instructions from the memory components, as well as the exchange of information between subsystems or components.

Peripherals (such as printers, scanners, cameras, or the like) and input/output (I/O) devices (such as a mouse, touchpad, keyboard, microphone, joystick, or the like) may couple to the computing device (1700) either directly or via an I/O controller (1735). These components may be connected to the computing device (1700) by any number of means known in the art, such as a serial port. One or more monitors (1745) may be coupled via a display or video adapter (1740) to the computing device (1700).

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A method for injecting power into or extracting power out of a power network at a point of common coupling (PCC) having one or more wires, comprising:
    obtaining Thévenin parameters in the form of at least a Thévenin voltage and a Thévenin resistance of an equivalent Thévenin circuit with respect to each wire of the PCC;
    calculating a total Thévenin power for all the wires based on a specific amount of power at the PCC and the obtained Thévenin parameters;
    calculating an optimal current to be injected into or extracted from the PCC so as to inject or extract a specific amount of power, wherein the calculation is based on the total Thévenin power and the Thévenin parameters including:
        changing Thévenin voltages for wires at a resistance weighted null reference point to a weighted Thévenin equivalent voltage vector dependent on Thévenin equivalent resistances;
        calculating an optimal Thévenin total wire power at the equivalent Thévenin voltage points;
        calculating a constant kA with the calculated Thévenin total wire power divided by the norm squared of the weighted Thévenin equivalent voltage vector; and
        calculating a weighted current vector by multiplying the constant kA by the weighted Thévenin voltage vector; and
    controlling an injection or extraction of current at the PCC in accordance with the optimal current.

2. The method as claimed in claim 1, wherein obtaining Thévenin parameters in the form of at least a Thévenin voltage and a Thévenin resistance of an equivalent Thévenin circuit with respect to each wire of the PCC, including:
    measuring a voltage at the PCC with no injected current to obtain a Thévenin voltage; and
    injecting a known current and measuring voltage changes to calculate a Thévenin resistance.

3. The method as claimed in claim 2, wherein the voltages measured are fundamental frequency voltages and calculated with respect to a resistance weighted null reference point dependent on Thévenin's wire equivalent resistance.

4. The method as claimed in claim 1, wherein controlling an injection or extraction of current at the PCC in accordance with the optimal current includes:
    controlling an injection or extraction of the optimal currents in each wire using a series connected converter or inverter.

5. A transmission mechanism The method as claimed in claim 1, wherein controlling an injection or extraction of current at the PCC in accordance with the optimal current includes:
    controlling an injection or extraction of the optimal currents in each wire using a shunt connected converter or inverter, including:
        measuring a source or load current on each wire at the PCC;
        calculating a difference between the measured current and a calculated optimal current; and
        injecting or extracting the difference in current using the shunt connected converter or inverter.

6. The method as claimed in claim 1, including iterating the method by:
    injecting or extracting a first calculated optimal current;
    re-obtaining the Thévenin parameters; and
    calculating a second calculated optimal current based on the re-obtained Thévenin parameters.

7. The method as claimed in claim 1, wherein controlling an injection or extraction of current injects a current in phase with the Thévenin voltage in a manner that reduces electrical transmission losses of the power network.

8. The method as claimed in claim 1, wherein the Thévenin parameters include a Thévenin reactance which is used for calculating a phase angle of the optimal current.

9. The method as claimed in claim 1, including calculating a Thévenin voltage measured from a resistance weighted null reference point by measuring a voltage of a wire at any reference point when no current is injected.

10. The method as claimed in claim 1, including:
calculating an optimal additional Thévenin power that can reach a network equivalent point of consumption when injecting or extracting a specific amount of power at a point of common coupling after the Thévenin parameters have been determined.

11. The method as claimed in claim 1, including:
calculating Thévenin total wire power by an iterative method including:
  calculating optimal wire currents;
  determining total power losses for each of the wires;
  deducing the total wire losses based on a specific amount of power at the point of common coupling; and
  iterating the method until the Thévenin power converges to sufficient accuracy.

12. A system for injecting power into or extracting power out of a power network at a point of common coupling (PCC) having one or more wires, comprising:
  a Thévenin parameter component for obtaining Thévenin parameters in the form of at least a Thévenin voltage and a Thévenin resistance of an equivalent Thévenin circuit with respect to each wire of the PCC;
  a Thévenin power component for calculating a total Thévenin power for all the wires based on a specific amount of power at the PCC and the obtained Thévenin parameters;
  an optimal current component for calculating an optimal current to be injected into or extracted from the PCC so as to inject or extract a specific amount of power, based on the total Thévenin power and the Thévenin parameters, wherein the optimal current component is capable of carrying out the steps of:
    changing Thévenin voltages for wires at a resistance weighted null reference point to a weighted Thévenin equivalent voltage vector dependent on Thévenin equivalent resistances;
    calculating an optimal Thévenin total wire power at the equivalent Thévenin voltage points;
    calculating a constant kA with the calculated Thévenin total wire power divided by the norm squared of the weighted Thévenin equivalent voltage vector; and
    calculating a weighted current vector by multiplying the constant kA by the weighted Thévenin voltage vector; and
  a controlling component for controlling an injection or extraction of current at the PCC in accordance with the optimal current.

13. The system as claimed in claim 12, wherein the Thévenin parameter component for obtaining Thévenin parameters in the form of at least a Thévenin voltage and a Thévenin resistance of an equivalent Thévenin circuit with respect to each wire of the PCC includes;
  a voltage measuring component for measuring a voltage at the PCC with no injected current to obtain a Thévenin voltage; and
  a known current injecting component for injecting a known current and the voltage measuring component also for measuring voltage changes to calculate a Thévenin resistance.

14. The system as claimed in claim 12, wherein the controlling component for controlling an injection or extraction of current at the PCC in accordance with the optimal current includes:
  a series connected converter or inverter for controlling an injection or extraction of the required optimal currents in each wire.

15. The system as claimed in claim 12, wherein the controlling component for controlling an injection or extraction of current at the PCC in accordance with the optimal current includes:
  a shunt connected converter or inverter for controlling an injection or extraction of the required optimal currents in each wire, including components for:
    measuring a source or load current on each wire at the PCC;
    calculating a difference between the measured current and a calculated optimal current; and
    injecting or extracting the difference in current using the shunt connected converter or inverter.

16. The system as claimed in claim 12, including an iterating component for iterating the method by:
  injecting or extracting a first calculated optimal current;
  re-obtaining the Thévenin parameters; and
  calculating a second calculated optimal current based on the re-obtained Thévenin parameters.

17. A computer program product for injecting power into or extracting power out of a power network at a point of common coupling (PCC) to the power network, wherein the PCC has one or more wires, the computer program product comprising a computer-readable medium having stored computer-readable program code for performing the steps of:
  obtaining Thévenin parameters in the form of at least a Thévenin voltage and a Thévenin resistance of an equivalent Thévenin circuit with respect to each wire of the PCC;
  calculating a total Thévenin power for all the wires based on a specific amount of power at the PCC and the obtained Thévenin parameters;
  calculating an optimal current to be injected into or extracted from the PCC so as to inject or extract a specific amount of power, wherein the calculation is based on the total Thévenin power and the Thévenin parameters including:
    changing Thévenin voltages for wires at a resistance weighted null reference point to a weighted Thévenin equivalent voltage vector dependent on Thévenin equivalent resistances;
    calculating an optimal Thévenin total wire power at the equivalent Thévenin voltage points;
    calculating a constant kA with the calculated Thévenin total wire power divided by the norm squared of the weighted Thévenin equivalent voltage vector; and
    calculating a weighted current vector by multiplying the constant kA by the weighted Thévenin voltage vector; and
  controlling an injection or extraction of current at the PCC in accordance with the optimal current.

\* \* \* \* \*